(12) United States Patent
Kesterson et al.

(10) Patent No.: US 12,199,503 B2
(45) Date of Patent: Jan. 14, 2025

(54) DRIVER FOR SWITCHED MODE POWER SUPPLY

(71) Applicant: Renesas Design (UK) Limited, Bourne End (GB)

(72) Inventors: John William Kesterson, Central Point, OR (US); James Crawford Steele, Chandler, AZ (US)

(73) Assignee: Renesas Design (UK) Limited, Bourne End (GB)

( * ) Notice: Subject to any disclaimer, the term of this patent is extended or adjusted under 35 U.S.C. 154(b) by 126 days.

(21) Appl. No.: 17/897,777

(22) Filed: Aug. 29, 2022

(65) Prior Publication Data

US 2024/0072643 A1 Feb. 29, 2024

(51) Int. Cl.
*H02M 1/38* (2007.01)
*H02M 1/00* (2006.01)
*H02M 1/088* (2006.01)

(52) U.S. Cl.
CPC ............ *H02M 1/38* (2013.01); *H02M 1/0025* (2021.05); *H02M 1/0095* (2021.05); *H02M 1/088* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10;
(Continued)

(56) References Cited

U.S. PATENT DOCUMENTS 9,148,078 B2 * 9/2015 Hattori ................. H03K 17/00
10,181,786 B1 * 1/2019 Hesse ............ H03K 19/018564
(Continued)

OTHER PUBLICATIONS

"Hierarchical design of a realistic buck controller", URL: https://www.workcraft.org/tutorial/design/hierarchical_buck/start, downloaded on Aug. 26, 2022.
(Continued)

*Primary Examiner* — Jeffrey A Gblende
(74) *Attorney, Agent, or Firm* — SCULLY, SCOTT, MURPHY & PRESSER, P.C.

(57) ABSTRACT

A driver for driving a switched-mode power supply is presented. The driver receives a set of input signals. Each input signal is configured for changing a state of an associated power switch from a first state to a second state. The driver generates an output signal to change the state of the associated power switch from the first state to the second state. When the first state is an on state and the second state is an off state, the driver asserts the output signal to change the state of the associated power switch to perform an on-off transition. When the first state is the off state and the second state is the on state, the driver delays the assertion of the output signal to perform an off-on transition by a predetermined delay time, so that the off-on transition is delayed until all intended on-off transitions have occurred.

18 Claims, 22 Drawing Sheets

(58) Field of Classification Search
CPC ........ H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H02M 1/38; H05B 39/048; B23K 11/24; H04B 2215/069

See application file for complete search history.

(56) References Cited

U.S. PATENT DOCUMENTS

| | | | | |
|---|---|---|---|---|
| 11,626,826 B1 * | 4/2023 | Barrenscheen | ...... | H03K 17/284 |
| | | | | 327/108 |
| 2023/0361670 A1 * | 11/2023 | Dobos | ............... | H03K 17/166 |

OTHER PUBLICATIONS

"Analog-to-asynchronous elements", URL: https://www.workcraft.org/a2a/start, downloaded on Aug. 26, 2022.

V. Khomenko et al., "WAITX: An Arbiter for Non-Persistent Signals", 23rd IEEE International Symposium on Asynchronous Circuits and Systems, 2017, San Diego, California, US, IEEE Computing Society.

* cited by examiner

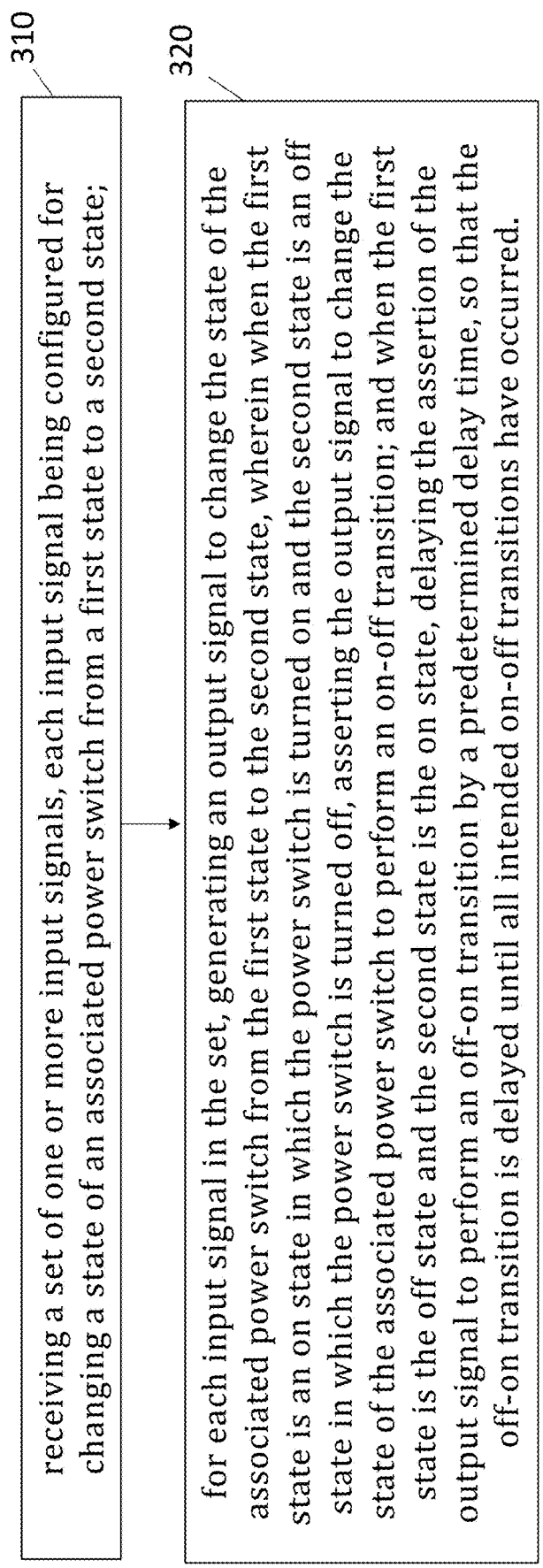

Figure 3

310 — receiving a set of one or more input signals, each input signal being configured for changing a state of an associated power switch from a first state to a second state;

320 — for each input signal in the set, generating an output signal to change the state of the associated power switch from the first state to the second state, wherein when the first state is an on state in which the power switch is turned on and the second state is an off state in which the power switch is turned off, asserting the output signal to change the state of the associated power switch to perform an on-off transition; and when the first state is the off state and the second state is the on state, delaying the assertion of the output signal to perform an off-on transition by a predetermined delay time, so that the off-on transition is delayed until all intended on-off transitions have occurred.

DRIVER FOR SWITCHED MODE POWER SUPPLY

TECHNICAL FIELD

The present disclosure relates to a driver and corresponding method for driving a switched mode power supply having a plurality of power switches. In particular, the present disclosure relates to a driver configured to prevent the occurrence of forbidden switching states.

BACKGROUND

Switched mode power supplies include several power switches that are operated between on and off states to perform the desired function, for instance a step-up conversion in a boost converter or a step-down conversion in a buck converter. In a simple 2-level buck converter it is important that when the switches change states, that the one being turned off must be off for a minimum deadtime before the other one is turned on. This is to avoid any possibility of shoot-through from the input voltage to ground in the case where both switches are momentarily on.

Switched mode power supplies may be implemented with different topologies for specific applications. As the number of power switches increases, the number of forbidden states for which undesirable effects may take place increases, and the driver for driving the switches becomes more complex.

It is an object of the disclosure to address one or more of the above mentioned limitations.

SUMMARY

According to a first aspect of the disclosure, there is provided a driver for driving a switched mode power supply having a plurality of power switches, the driver being adapted to receive a set of one or more input signals, each input signal being configured for changing a state of an associated power switch from a first state to a second state; wherein for each input signal in the set, the driver is configured to generate an output signal to change the state of the associated power switch from the first state to the second state, wherein when the first state is an on state in which the power switch is turned on and the second state is an off state in which the power switch is turned off, the driver asserts the output signal to change the state of the associated power switch to perform an on-off transition; and when the first state is the off state and the second state is the on state, the driver delays the assertion of the output signal to perform an off-on transition by a predetermined delay time, so that the off-on transition is delayed until all intended on-off transitions have occurred.

Optionally, the driver comprises a plurality of control cells, each control cell comprising a first circuit configured to receive an input signal from the set of input signals and to generate the said output signal.

Optionally, the driver comprises a logic circuit adapted to generate a first logic signal having a first state to prevent an assertion of the output signal for changing the associated power switch from the off state to the on state, and a second state to permit the assertion of the output signal for changing the associated power switch from the off state to the on state.

Optionally, the logic circuit is adapted to generate a second logic signal, having a first state and a second state; the logic circuit being configured to set the second logic signal into the first state when the states of the said one or more input signals match the states of the one or more output signals, and to set the second logic signal into the second state when the states of the said one or more input signals do not match the states of the one or more output signals.

For instance the first state may be a true state (logic 1) and the second state a false state (logic 0).

Optionally, the logic circuit is adapted to generate a third logic signal, having a first state and a second state; the logic circuit being configured to set the third logic signal into the second state upon receipt of the set of one or more input signals, to maintain the third logic signal in the second state for the predetermined delay time, and to set the third logic signal back into the first state once all the power switches intended to be turned off have been turned off.

For instance the first state may be a true state (logic 1) and the second state a false state (logic 0).

Optionally, the first circuit comprises a memory device coupled to an arbitration circuit, the arbitration circuit having a first input for receiving the first logic signal, a second input for receiving the output of the memory device and an output for providing the output signal.

Optionally, the memory device comprises a flip flop and the arbitration circuit comprises a mutual exclusion cell.

Optionally, each control cell comprises a second circuit configured to generate a feedback signal indicating when a power switch can be turned on without overlap with another power switch being turned on.

Optionally, each control cell comprises a third circuit configured to generate a programmable delay signal.

Optionally, the first circuit and the second circuit are adapted to receive the programmable delay signal.

Optionally, the logic circuit comprises an asynchronous state machine configured to generate the first logic signal and the second logic signal.

For example the asynchronous state machine may be a Quasi-Delay-Insensitive (QDI) asynchronous state machine.

Optionally, the driver comprises a circuit portion configured to generate a second feedback signal associated with the second logic signal.

Optionally, the logic circuit comprises a plurality of wait cells.

Optionally, wherein a first wait cell is configured to identify the rising edge of the third logic signal; a second wait cell is configured to identify the falling edge of the third logic signal; and a third wait cell is configured to identify the rising edge of the second feedback signal.

Optionally, the logic circuit comprises a sub circuit configured to generate the third logic signal, wherein the sub circuit comprises a first portion adapted to receive the input signal and the feedback signal and to generate an intermediate signal for each power switch; and a second portion adapted to receive the intermediate signal from each power switch and to generate the third logic signal.

Optionally, the first portion comprises a delay cell for each power switch.

According to a second aspect of the disclosure, there is provided a method of driving a switched mode power supply having a plurality of power switches, the method comprising
receiving a set of one or more input signals, each input signal being configured for changing a state of an associated power switch from a first state to a second state; and
for each input signal in the set, generating an output signal to change the state of the associated power switch from the first state to the second state, wherein when the first state is an on state in which the power switch is turned on and the second state is an off state in which the power switch is turned off, asserting the output signal to change the state of the associated power switch to perform an on-off transition; and when the first state is the off state and the second state is the on state, delaying the assertion of the output signal to perform an off-on transition by a predetermined delay time, so that the off-on transition is delayed until all intended on-off transitions have occurred.

Optionally, the method comprises generating a first logic signal having a first state to prevent an assertion of the output signal for changing the associated power switch from the off state to the on state, and a second state to permit the assertion of the output signal for changing the associated power switch from the off state to the on state.

Optionally, the method comprises generating a second logic signal, having a first state and a second state; setting the second logic signal into the first state when the states of the said one or more input signals match the states of the one or more output signals, and setting the second logic signal into the second state when the states of the said one or more input signals do not match the states of the one or more output signals.

Optionally, the method comprises generating a third logic signal having a first state and a second state; setting the third logic signal into the second state upon receipt of the set of one or more input signals, to maintain the third logic signal in the second state for the predetermined delay time, and setting the third logic signal back into the first state once all the power switches intended to be turned off have been turned off.

The options described with respect to the first aspect of the disclosure are also common to the second aspect of the disclosure.

DESCRIPTION OF THE DRAWINGS

The disclosure is described in further detail below by way of example and with reference to the accompanying drawings, in which:

FIG. 3 is a flow chart of a method for driving a switched mode power supply according to the disclosure;

DESCRIPTION

Figure 1:
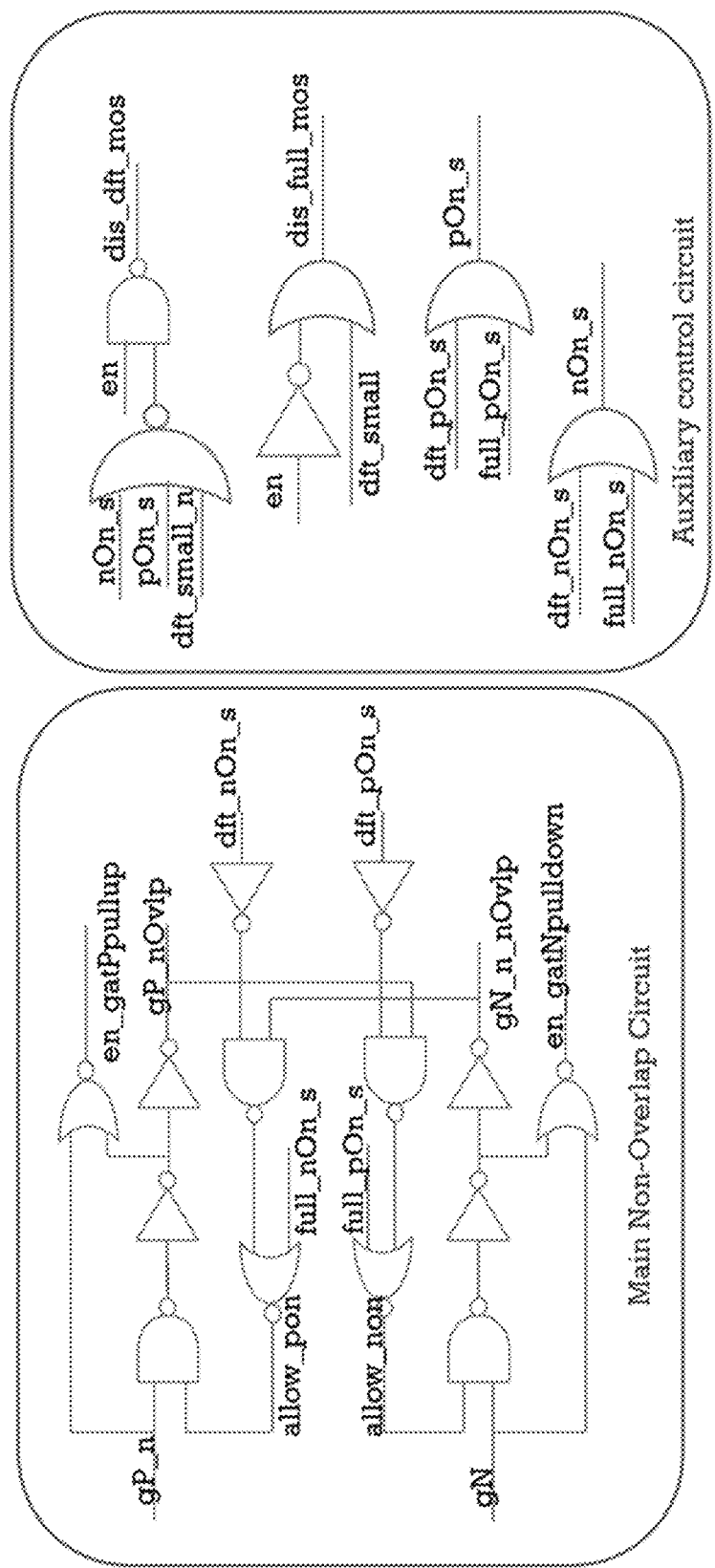
FIG. 1 is a diagram of a conventional non-overlap logic diagram to prevent the occurrence of overlapping states in a 2-level buck converter.

FIG. 1 illustrates a conventional non-overlap logic diagram to prevent the occurrence of overlapping states in a 2-level buck converter. The non-overlap logic is based on a power switch gate feedback. The non-overlap circuit provides non-overlap between PMOS switch turn on to NMOS switch turn off, and between NMOS switch turn off to PMOS switch turn on. The nonoverlap output signals gP_nOvlp and gN_nOvlp, and the signals en_gatPpullup and en_gatNpulldown are provided to a driver slice circuit.

Such a logic circuit can be used to prevent the occurrence of overlapping states in a power supply having two power switches. However the circuit of FIG. 1 is not suitable for a hybrid or multi-level converters that operate many switches.

Figure 2:
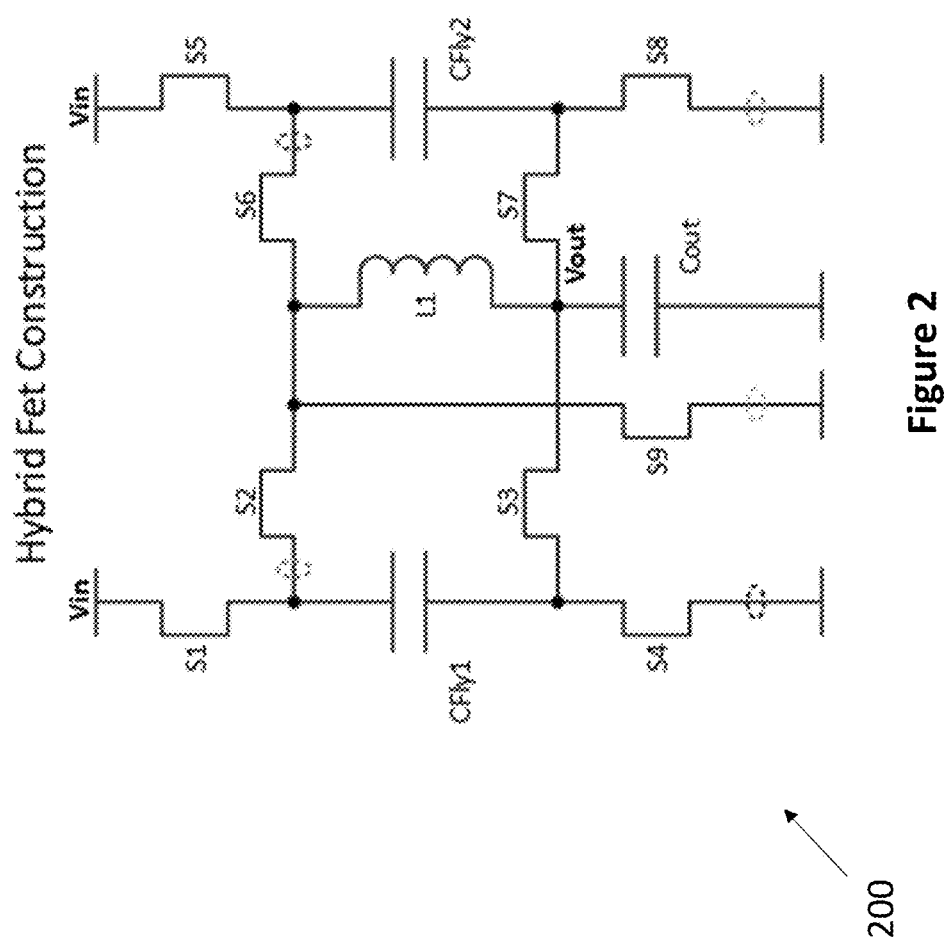
FIG. 2 is a diagram of a hybrid switch mode power supply.

FIG. 2 is a diagram of a hybrid switch mode power supply. The topology of the circuit 200 includes two flying capacitors CFly1 and CFly2, one inductor IA and nine power switches labelled S1-S9.

In this specific example many different switching sequences can happen. A complex list of switch on states can cause shoot through (high current paths) that are not desired current paths for normal operation. In particular, the following conditions must be avoided:

a) S1 and S4 at the same time—would cause Cfly1 to get immediately charged to Vin. In this circuit Cfly is typically maintained at Vin-Vo; and therefore if both of these switches are turned on in an overlapping way, there would be a high redistribution current that could potentially damage the switches in addition to wrongly positioning the voltage across Cfly1.

b) S3 and S4 at the same time—would cause a short of Vout.

c) S5 and S8 at the same time—would cause Cfly2 to get immediately charged to Vin (similar to (a)).

d) S7 and S8 at the same time—would cause a short of Vout (similar to (b)).

e) S2 and S9 at the same time—would bring the top of Cfly1 to ground, potentially shorting Cfly1 or Vin to ground.

f) S6 and S9 at the same time—would bring the top of Cfly2 to ground, potentially shorting Cfly2 or Vin to ground.

g) S1, S2, S6, and S8 would short Vin directly to Cfly2.

h) S5, S6, S2, and S4 would short Vin directly to Cfly1.

i) S2, S3, S6, and S8—Shorts Vout plus Vcfly1 to Vcfly2 through ground causing a high redistribution current through both fly-caps and incorrectly repositioning them.

j) S2, S4, S6, and S7—Shorts Vout plus Vcfly 2 to Vcfly1 through ground causing a high redistribution current through both fly-caps and incorrectly repositioning them.

FIG. 3 is a flow chart of a method for driving a switched mode power supply having a plurality of power switches.

At step 310 a set of one or more input signals is received. Each input signal is configured for changing a state of an associated power switch from a first state to a second state.

The set of input signals may be used to request on-off transitions for one or more of the power switches. The set of input signals may also be used to request off-on transitions for one or more of the power switches. The set of input signals may also be used to request a combination of on-off transitions and off-on transitions of the power switches.

At step 320, for each input signal in the set, an output signal is generated to change the state of the associated power switch from the first state to the second state. When the first state is an on state in which the power switch is turned on and the second state is an off state in which the power switch is turned off, the output signal is asserted to change the state of the associated power switch to perform an on-off transition. When the first state is the off state and the second state is the on state, the assertion of the output signal to perform an off-on transition is delayed by a predetermined delay time, so that the off-on transition is delayed until all intended on-off transitions have occurred.

As explained above the intended transitions of the power switches, either on-off transitions or off-on transitions, are defined by the set of input signals.

The above method prevents the incidence of unsafe conditions which could occur during the transition of the multiple switches from one state to another.

Figure 4:
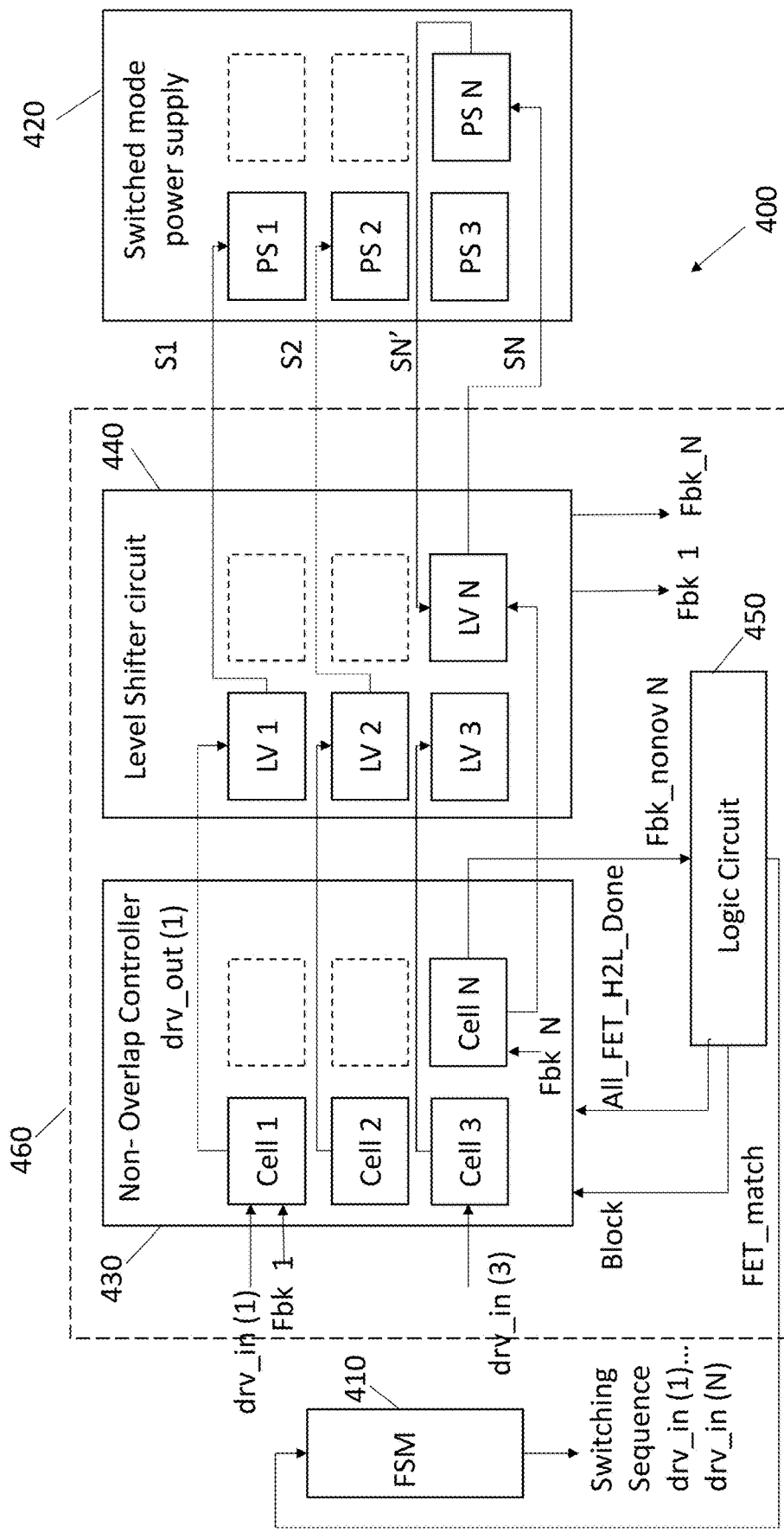
FIG. 4 is a diagram of a system for implementing the method of FIG. 3.

FIG. 4 is a diagram of a system that includes a switched mode power supply and a driver for implementing the method of FIG. 3. The system 400 includes a switching sequence generator 410, a switched mode power supply 420, and a driver 460. The driver 460 includes a non-overlap controller 430, a level shifter 440, and a logic circuit 450. For clarity, only some of the connections have been represented in FIG. 4.

The switch mode power supply 420 has a plurality of power switches labelled PS 1 to PS N. The topology of the switch mode power supply may vary depending on the application. It will be appreciated that the power switches may be implemented in various fashion, for instance using field-effect transistor (FET) transistors, including P-type or N type, or insulated-gate bipolar transistor (IGBT) transistors. The system 400 is represented with N channels associated with the N power switches.

The switching sequence generator 410 is adapted to generate a set input signals labelled drv_in(1) to drv_in(n) which together form a switching sequence. Each input signal is configured for changing a state of an associated power switch (PS) of the switch mode power supply 420, from a first state to a second state. For instance the switching sequence generator 410 may be implemented as a finite state machine (FSM).

The non-overlap controller 430 includes N cells, also referred to as non-overlap cells, labelled Cell 1 to Cell N.

The level shifter circuit 440 includes N level shifter labelled LV 1 to LV N. Each level shifter LV i receives the output signal dry_out (i) from a corresponding cell i and generated a signal Si sent to the control terminal of the associated power switch PS i. For instance, the signal Si may be a gate voltage sent to the gate of an FET power switch.

The logic circuit (450) is adapted to generate a first logic signal, a second logic signal and a third logic signal.

The first logic signal also referred to as block signal has a first state to prevent an assertion of the output signal for changing the associated power switch from the off state to the on state, and a second state to permit the assertion of the output signal for changing the associated power switch from the off state to the on state.

The second logic signal also referred to as FET_MATCH signal, has a first state (true state logic 1) and a second state (false state logic 0). The logic circuit 450 is configured to set the FET_MATCH signal into the first (true) state when the states of the input signals match the states of the output signals, and to set the FET_MATCH signal into the second (false) state when the states of the input signals do not match the states of the output signals. The FET_MATCH signal is sent to the FSM 410, indicating that the operation is complete, and that the FSM 410 is free to progress to the next state.

An FET match detect logic is provided to indicate when all power switches are set equivalent to the drive signals presented by the controlling state machine.

The third logic signal also referred to as ALL_FET_H2L_DONE signal, has a first state (true state logic 1) and a second state (false state logic 0). The logic circuit (450) is configured to set the ALL_FET_H2L_DONE signal into the second (false) state upon receipt of the set of input signals, and to maintain the ALL_FET_H2L_DONE signal in the second (false) state for a predetermined delay time. Then, once all the power switches intended to be turned off have been turned off the logic circuit (450) sets the third logic signal back into the first (true) state.

The ALL_FETS_H2L_DONE signal is used to indicate when all switches that are to be turned off in the new state have been turned off. This third logic signal is used to ensure that no switch that is to be turned on in the new state will be turned on until all of the switches that are to be turned off in the new state are turned off.

An exemplary detailed implementation of the logic circuit 450 is provided later in the description. The logic circuit 450 includes several sub-circuits: the circuit of FIG. 10 for generating the All_FET_H2L_DONE signal, the circuit of FIG. 11 for generating the fet_fb_match signal from which the FET_match signal derives, the wait cell circuits of FIG. 12, and the asynchronous state machine of FIG. 14 for generating the block signal.

It is assumed that the finite state machine 410 that generates the switching patterns does not output illegal (short-circuit) states, however the transient states of the power switches may still create short-circuit. The driver 460 prevents illegal states to occur during the transitions when switching from one state to another state. This is achieved while maintaining a relatively high operating speed.

At each FSM state the switching operation may be partitioned into two stages: a first stage for driving the power switches that need to be turned OFF and a second stage for driving power switches that need to be turned ON. Since the drive signals from the FSM may have some jitter, a window may be created for the drive signals to be registered and processed in two stages. A switch that does not change from one state to another state will be allowed to remain in that state.

While the first stage takes place, the driving signals are prevented from going high using the first logic signal (block signal), thus effectively postponing the second stage. The completion of the first stage is indicated by a feedback signal, either directly from the switches or from a synthesized delay signal configured to be sufficiently long.

Figure 5A:
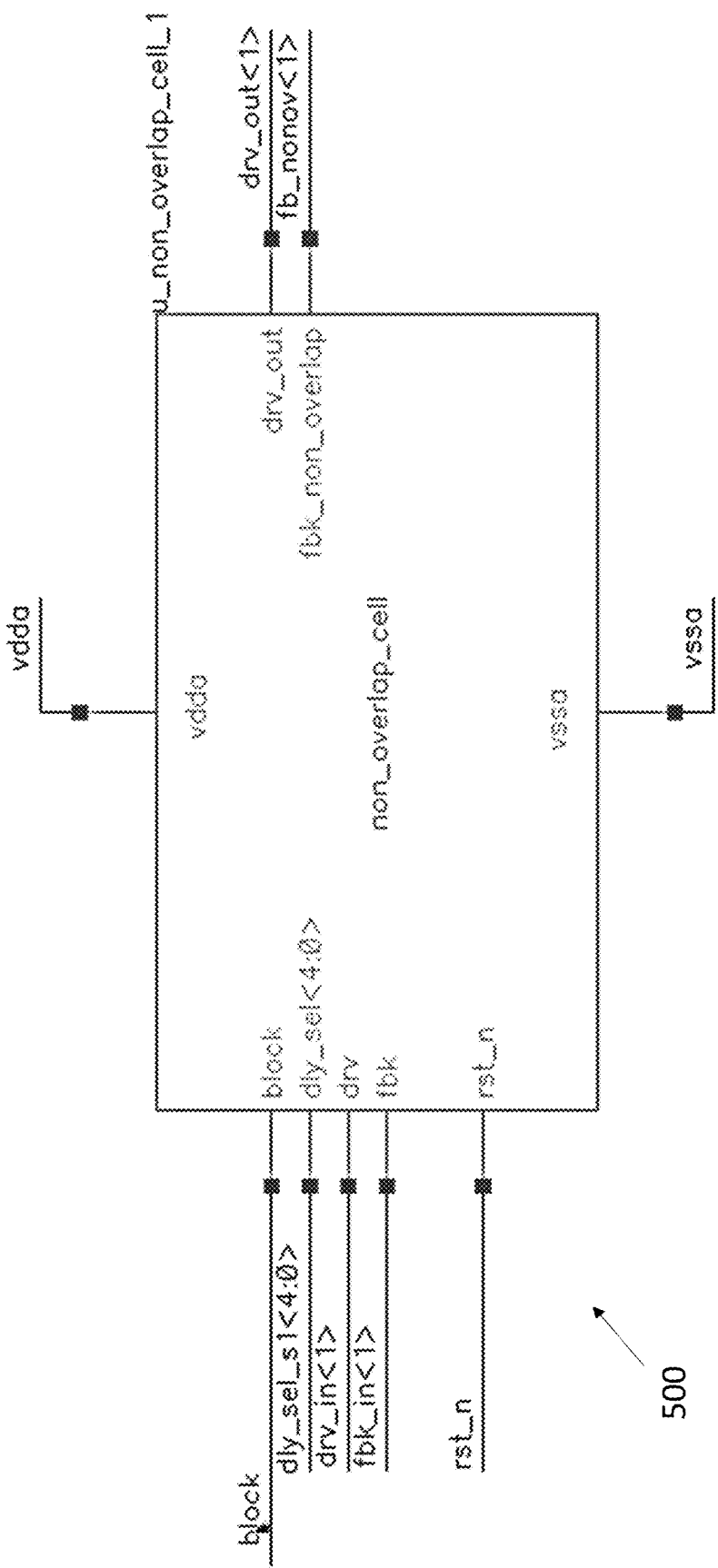
FIG. 5A is a schematic diagram showing the inputs and outputs of a non-overlap cell.

FIG. 5A is a diagram illustrating the inputs and outputs of a non-overlap cell as shown in FIG. 4.

The input signals include: a block signal also referred to as trigger signal, a delay selection signal dly_sel, the input signal dry_in (i) from the switching sequence generator, the feedback signal Fbk_in(i) from each power switch via the level shifter, and a reset signal rst_n. The output signals include the dry_out (i), and the non-overlap signal labelled Fbk_nonov (i). The matching signal labelled FET_match and the end signal labelled All_FET_H2L_Done signal, are used to form the block signal and will be described in more details below.

Every non-overlap cell receives the same block signal. The function of this block signal is to prevent any power swich that is off (open) to turn on (closed) until the block signal is removed (de-asserted). If a power switch is already on in the present state and is staying on in the next state, then it is allowed to remain on during the transition. But if it is going to turn from off to on, it will not be able to do it until the block signal is removed.

The delay selection signal dly_sel is used to choose the delay time and the mode of the output feedback signal. The source of feedback from each cell is selected by 2 bits that are the mode of the feedback signal. The choices are: i) feedback from the driver; ii) synthesized feedback from the programmable delay of the dry_out signal; iii) the OR of i) and ii) above which equates to the latter of the two; iv) the AND of i) and ii) above which equates to the earlier of the two. The reset signal rst_n is for initialization of the circuit at power on reset.

The input signal dry_in (i) is sent by the switching sequence generator 410 for ordering the power switch transition(s). The feedback signal Fbk(i) arises from each power switch via the level shifter. The output signal dry_out (i) is directed to the level shifter 440. The non-overlap signal labelled Fbk_nonov (i) is sent to the logic circuit 450. The fb_nonov output indicates the status of the local power switch that is the switch corresponding to this instantiation of the non-overlap cell.

Figure 5B:
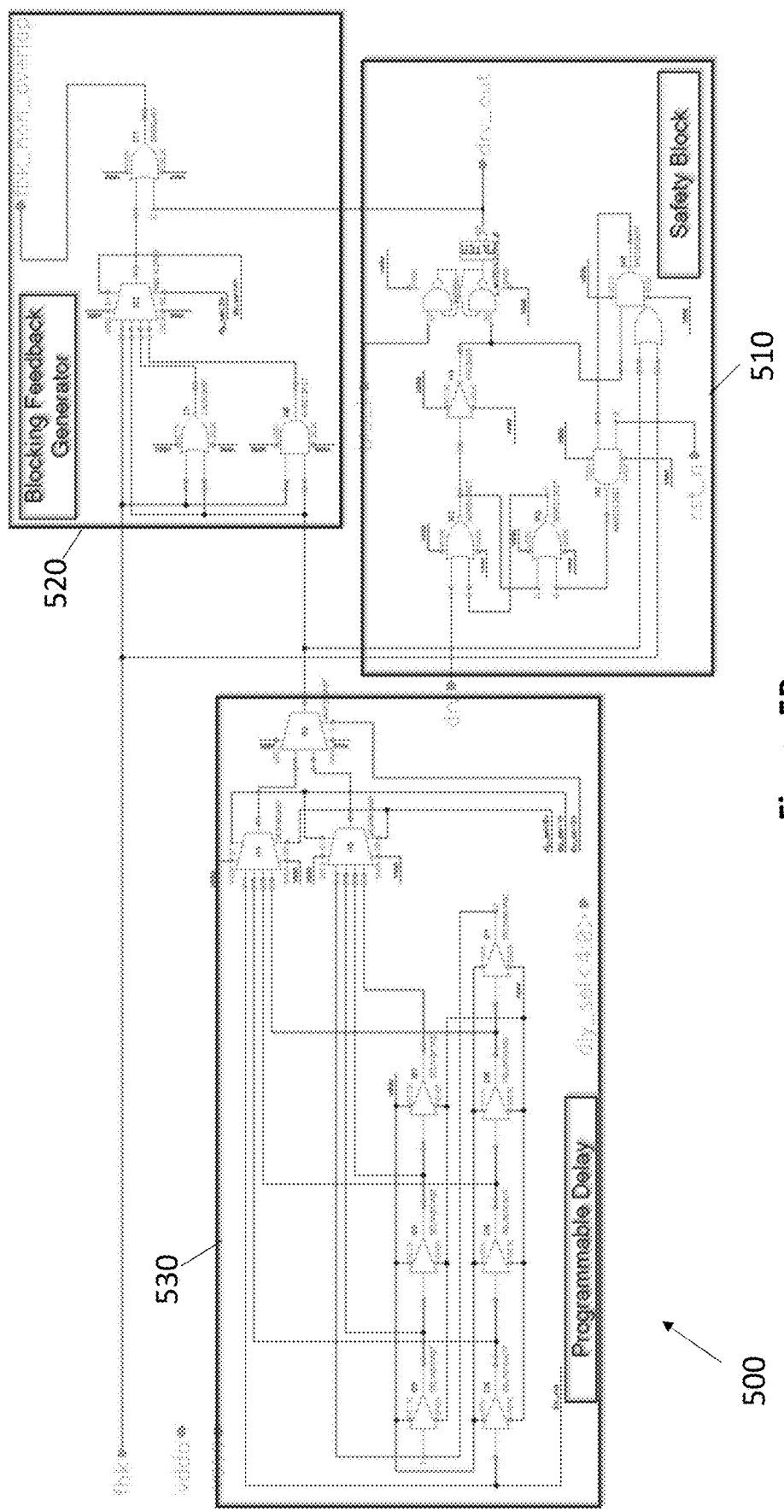
FIG. 5B is a diagram of an exemplary non-overlap cell.

FIG. 5B is a diagram of an exemplary non-overlap cell. The non-overlap cell 500 includes a first circuit 510 also referred to as safety circuit, a second circuit 520 also referred to as blocking feedback generator, and a third circuit 530 also referred to as programmable delay circuit or delay feedback synthesizer.

The safety circuit 510 is configured to receive the input signal Dry_in from the generator 410 and to generate the output signal Dry_out. The blocking feedback generator 520 is configured to receive the output signal Dry_out from the circuit 510, the programable delayed version of Dry_in, and the feedback signal fbk to generate the non-overlap signal fbk_non_overlap. The programmable delay circuit 530 is configured to generate a delay synthesized feedback signal delay_synth_fb that may be used by the safety circuit 510 and the blocking feedback generator 520. For instance the delay_synth_fb signal may be used in the safety circuit 510 for safe reset of a set-dominant SR flop present in the circuit.

The three circuits that make the non-overlap-cell will be used N times where N is the number of power switches in the design. Therefore, every power switch that is presently turned off and is to be turned on will not actually be turned on until the block signal is removed, thus ensuring that no power switch is turned on until all switches that need to be off for the "next state" are successfully turned off and verified to be turned off.

Figure 6A:
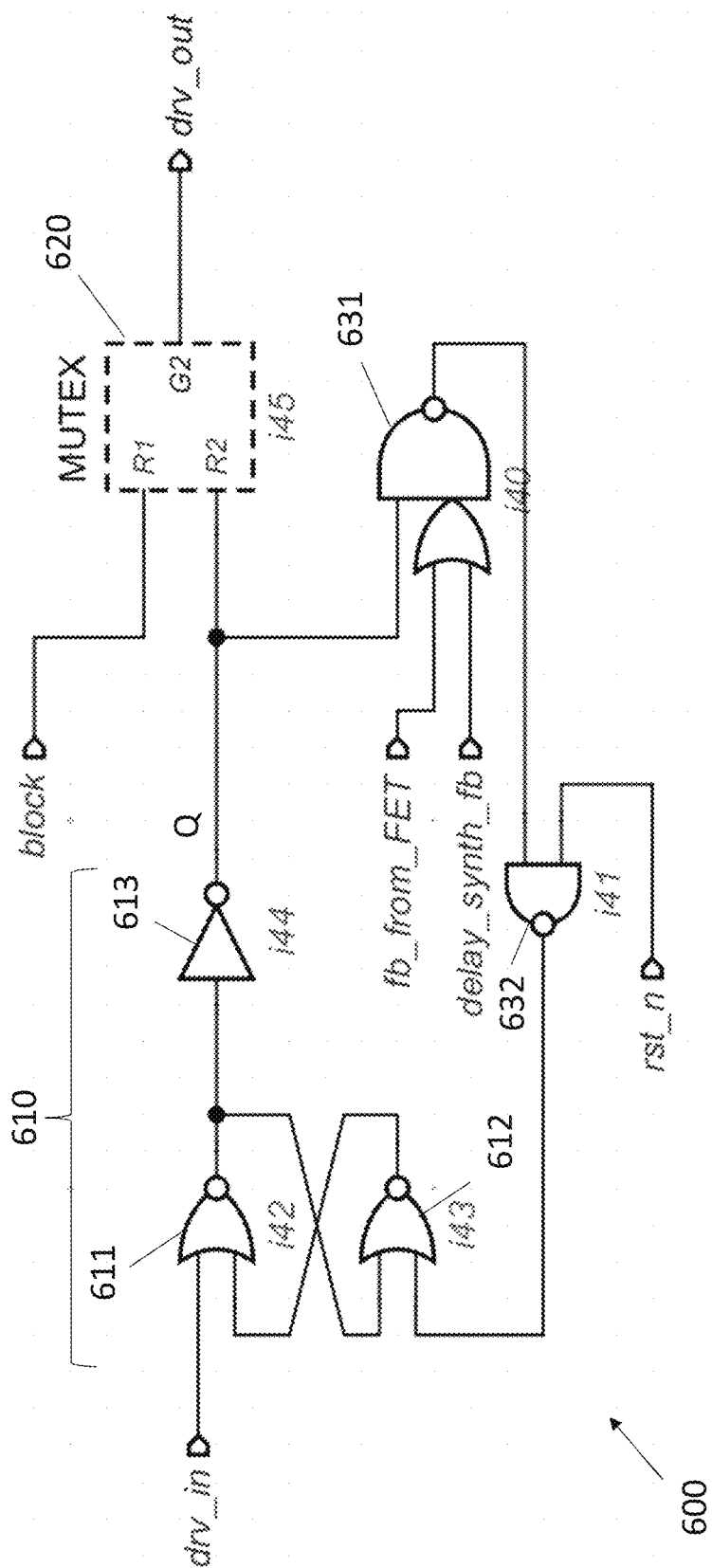
FIG. 6A is an exemplary implementation of a safety circuit for use in a non-overlap cell.

FIG. 6A is an exemplary implementation of a safety circuit for use in a non-overlap cell. The non-overlap cell 600 includes an RS flip-flop 610 coupled to an arbitration circuit such as Mutual Exclusion (MUTEX) cell 620, and two NAND gates 631 and 632. The set dominant RS flip-flop 610 is formed of two cross-coupled NOR gates 611, 612 coupled to an inverter 613.

The RS flip-flop receives the input signal dry_in at NOR gate 611 and the output of NAND gate 632 at the NOR gate 612. The MUTEX cell 620 has a first input R1 to receive the block signal, a second input R2 to receive the output Q of the RS flip-flop and an output G2 to provide the output signal dry_out. The NAND gate 631 has a first input to receive the output Q, and a second input for receiving the power switch feedback (fb_from_FET) signal or the delay synthesized feedback (delay_synth_fb) signal via an OR gate. The NAND gate 632 has a first input connected to the output of 631 and a second input for receiving a reset signal rst_n.

In operation this set dominant RS flip-flop forces the output Q of the inverter 613 to go high when the drive signal goes high. The RS flip-flop is used so that it will not reset until the power switch feedback (fb_from_FET) signal or the delay synthesized feedback (delay_synth_fb) signal indicate that the power switch (for instance an FET) has actually turned on. This ensures that even if a very narrow dry_in signal occurs, that it will last long enough at the next stage input to guarantee that it is seen at the power switch. This is accomplished through causal acknowledgement, because neither the power switch feedback nor the delay synthesized feedback can occur until after the power switch is turned on. Once the SR flop output Q goes true, it cannot be reset until either fb_from_FET or delay_synth_fb is true. Since those signals come as a result of the output of the MUTEX 620, a dry_in pulse signal cannot be stopped until it has gone through the feedback loop.

The dry_in signal can be in most cases a step function, however it could also be in some cases a very narrow pulse. In this instance, the safety circuit 610 ensures that the dry_out stays on long enough to get back through the feedback path because both fb_from_FET and delay_synth_fb are intended to indicate that the switch has indeed been turned on.

The set-dominant SR flop is set by the assertion of the drive signal that comes from the state machine and can only be reset when (i) the drive signal has deasserted AND (ii) a feedback either from a delay of the input drive (fb_from_FET) or a signal from the power switch itself (fv_from_FET) that indicates it has turned on has occurred.

The MUTEX cell or element 620 is an arbitration circuit that will grant an output at G2 when a request R2 is applied, if and only if there is no block request before it on R1. If both R1 and R2 are asserted at the same time, the metastability that would occur will be captured inside the MUTEX element 620. For instance a metastable event can occur if R1=R2=0 and then R1=R2=1 at the same time. If one of the NAND gates goes metastable, that will not be seen on G1 or G2. Therefore, if the block signal is true before the drive signal from the set-dominant SR flop is asserted, the G2 output to the drive out will NOT assert until the block function is de-asserted.

Figure 6B:
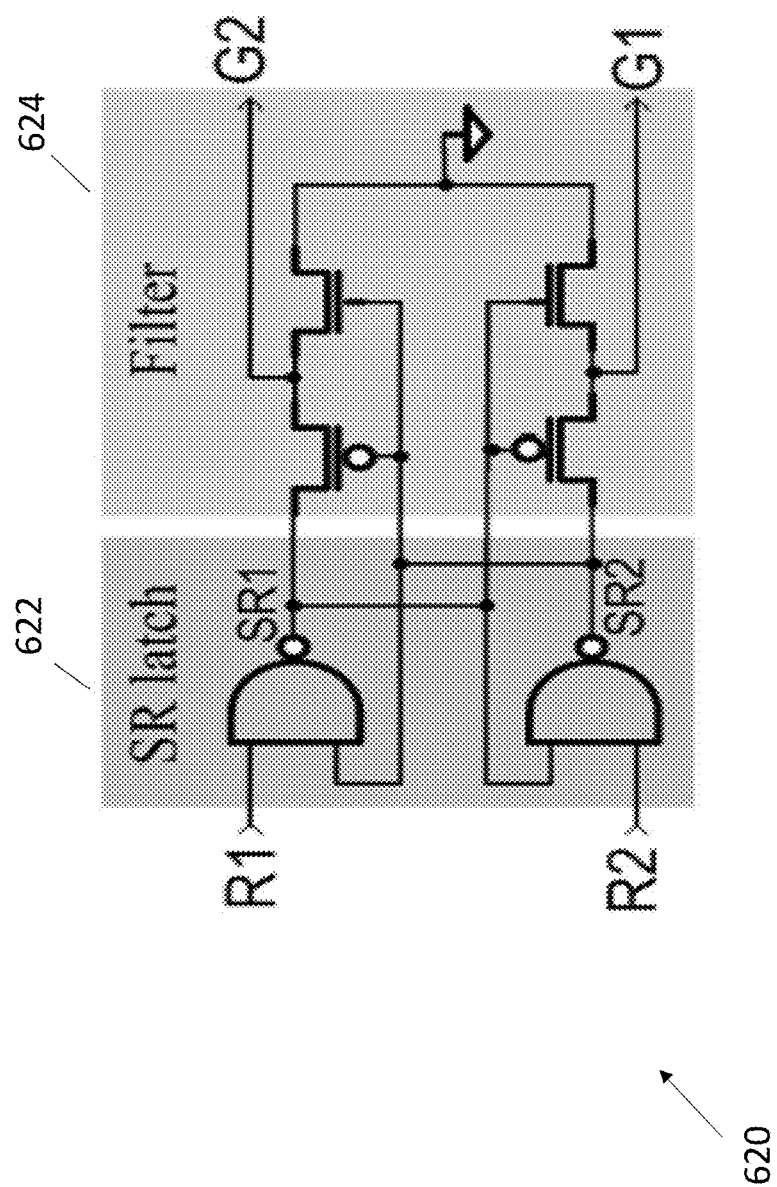
FIG. 6B is a diagram of a Mutual Exclusion (MUTEX) cell.

FIG. 6B illustrates a Mutual Exclusion (MUTEX) cell or element. Various implementations of the MUTEX cell can be envisaged. In this example the MUTEX cell 620 is formed of a set reset latch circuit 622 (cross coupled NAND gates) coupled to a filter circuit 624 also referred to as metastability filter. The MUTEX cell has two inputs for receiving the request signals R1 and R2 and two outputs for providing signals G1 and G2.

In operation, the rising edge of the logic signals R1 and R2 may occur at different times. If R1 rises before R2, then the output signal G1 goes high (for instance logic 1) and G2 is held low (logic 0). Conversely, if R2 rises before R1, then the output signal G2 goes high (for instance logic 1) and G1 is held low (logic 0).

If R1 and R2 rise at the same time, then the MUTEX cell selects either G1 or G2. Stated another way, only one of G1 and G2 goes high, while the remaining signal is held low.

As a result a MUTEX cell can be used to prevent a circuit to be trapped in a state that is neither a stable 0 nor a stable 1, also referred to as metastable state. A metastable state can lead to the circuit behaving in an unpredictable way and potentially to system failure.

Figure 7:
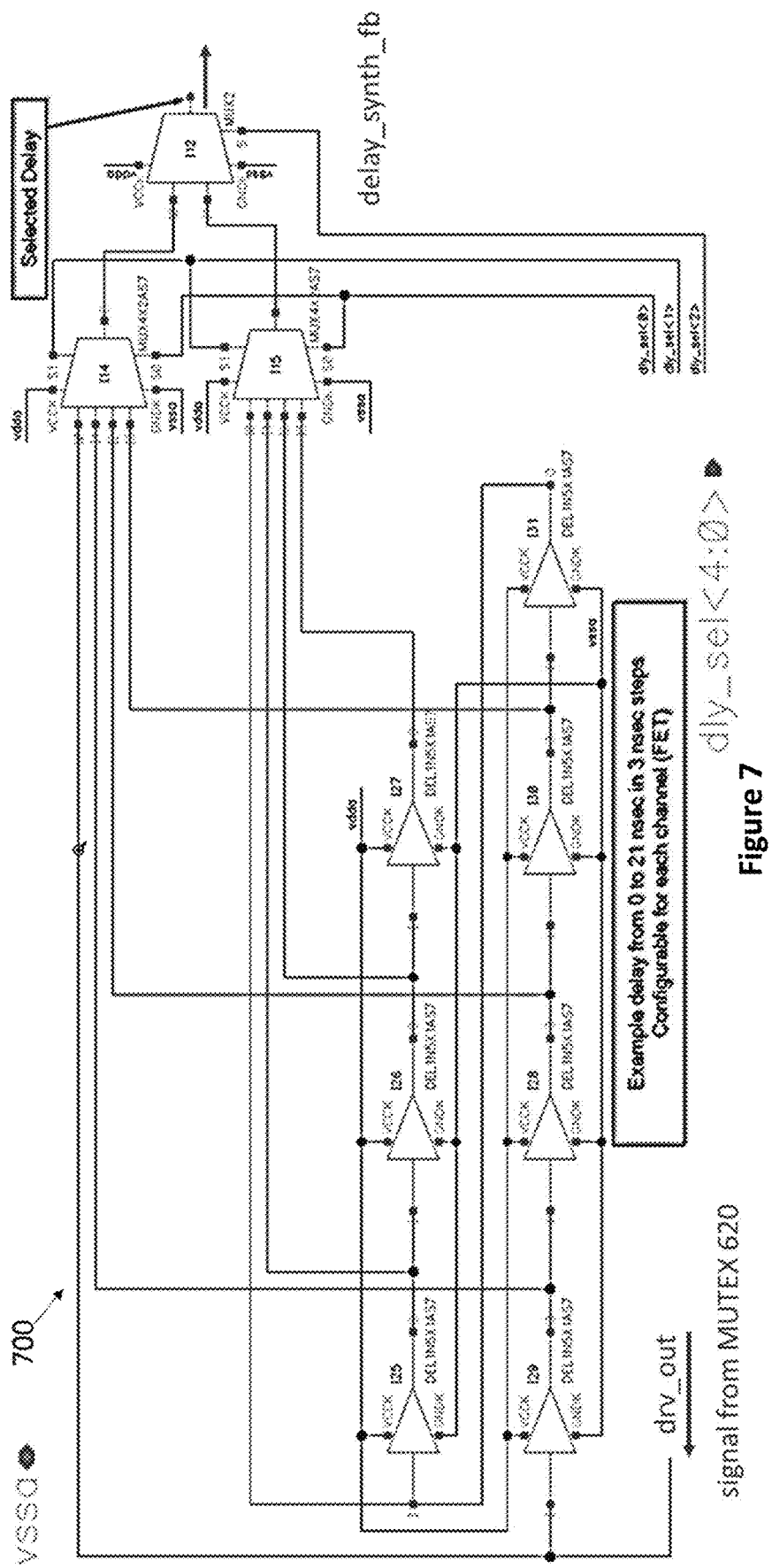
FIG. 7 is a diagram of a delay feedback synthesizer for use in a non-overlap cell.

FIG. 7 is an exemplary implementation of a delay feedback synthesizer for use in a non-overlap cell. The delay feedback synthesizer, also referred to as programmable delay circuit 700 has an input for receiving the output signal dry_out of the safety circuit 600 and an output providing the delay synthesized feedback signal delay_synth_fb. The delay synthesized feedback signal is provided to the safety circuit 600 as shown in FIG. 6A and to the blocking feedback generator as shown in FIG. 8 below.

The programmable delay line generated the feedback signal delay_synth_fb that can be used to determine when the power switch is turned off.

Therefore the programmable delay circuit 700 that can be used instead of the feedback indicating that the relevant power switch has been turned on or off. This programmable delay circuit 700 allows the non-overlap controller to operate when no direct feedback from the power switch is available. It also allows for fine tuning of the dead-time for efficiency optimization. The delay circuit 700 may be adjusted to prevent unintended shoot-through if transistors do not turn off as quickly as the synthesized delay indicates that they have turned off.

Figure 8:
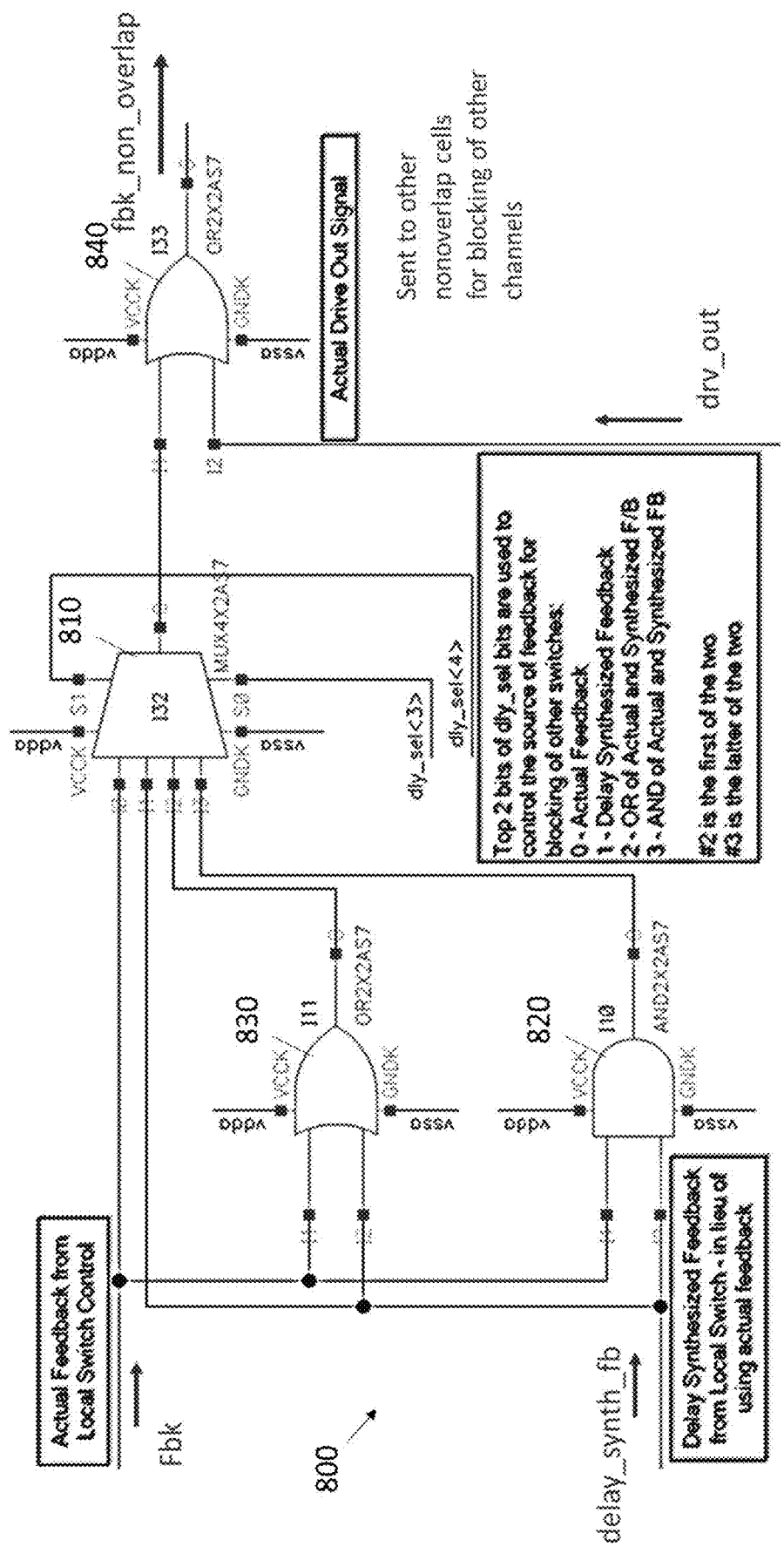
FIG. 8 is a diagram of a blocking feedback generator for use in a non-overlap cell.

FIG. 8 is an exemplary implementation of a blocking feedback generator for use in a non-overlap cell. The blocking feedback generator 800 includes a multiplexor 810, an AND gate 820, and two OR gates 830, 840. The AND gate 820 has a first input for receiving a power switch feedback signal Fbk and a second input for receiving the delay synthesized feedback signal. Similarly the OR gate 830 has a first input for receiving the power switch feedback signal Fbk and a second input for receiving the delay synthesized feedback signal.

The multiplexor 810 has a first input for receiving the power switch feedback signal Fbk, a second input for receiving the delay synthesized feedback signal, a third input for receiving the output of the OR gate 830 and a fourth input for receiving the output of the AND gate 820. The OR gate 840 has a first input for receiving the output of the multiplexor 810 and a second input for receiving the output signal dry_out from the safety circuit 600. The output of the OR gate 840 provides the non-overlap feedback signal fbk_non_overlap. The non-overlap feedback signal fbk_non_overlap is sent to a logic circuit (see logic circuit 450 of FIG. 4) to determine when to block the turn on of other power switches.

The blocking feedback generator 800, also referred to as block selection circuit provides a flexibility of use for the operator. The multiplexer 810 is operable to transmit the actual feedback Fbk from the power switch, or the synthesized feedback generated with a delay delay_synth_fb, or the output of OR gate 830 (that is the OR of the Fbk, delay_synth_fb signals) which means the latter of the two falling edges, or the output of the AND gate 820 (that is AND of Fbk, delay_synth_fb signals) which means the earlier of the two falling edges.

The turn on of the power switch is not delayed since the dry_out signal (output of the safety circuit) is provided at the OR gate 840. Instead it is the turn off that is delayed. To block other turn on activities, it is only required that the falling edge of the local switch to be delayed by either the feedback signal or the delay synthesized feedback signal. Once the drive out signal asserts true, the other part of the system knows, via the fbk_non_overlap signal, that this switch is on until a delay after it turns off.

FIG. 9 is a waveform diagram illustrating the operation of the non-overlap controller as illustrated in FIG. 4 in three exemplary scenarios.

In this example a switch mode power supply having five power switches is considered (N=5). The finite state machine FSM 410 provides a switching sequence having five input signals shown as Drv_in(1) to Drv_in(5). The non-overlap controller has five non-overlap cells, each cell providing an output signal labelled Drv_out(1) to Drv_out(5).

The logic circuit 450 generates three signals that include the All_FET_H2L_DONE signal, the FET_match signal and the block signal.

The ALL_FETS_H2L_DONE is an internal signal configured as follows. When it is true (logic high or logic 1) it means that any power switch that has a drive off from the input has been set to a drive off in the output. The ALL_FETS_H2L_DONE signal starts out in the true state because all the outputs are equal to the inputs. The circuit also has a special function that says even if all the outputs are off with corresponding inputs set to off, if there has been a turn on activity on any input, this ALL_FETS_H2L_DONE signal will go low for a minimum of 3 ns.

The FET_MATCH signal is used to indicate that the state of all the power switches agree with their corresponding inputs from the finite state machine (FSM).

The BLOCK signal is configured to prevent turning on any drive out signal. With reference to the safety module of FIG. 6, when the block signal is true no high drive input will pass through the MUTEX element 620 until this BLOCK signal goes false.

Figure 9A:
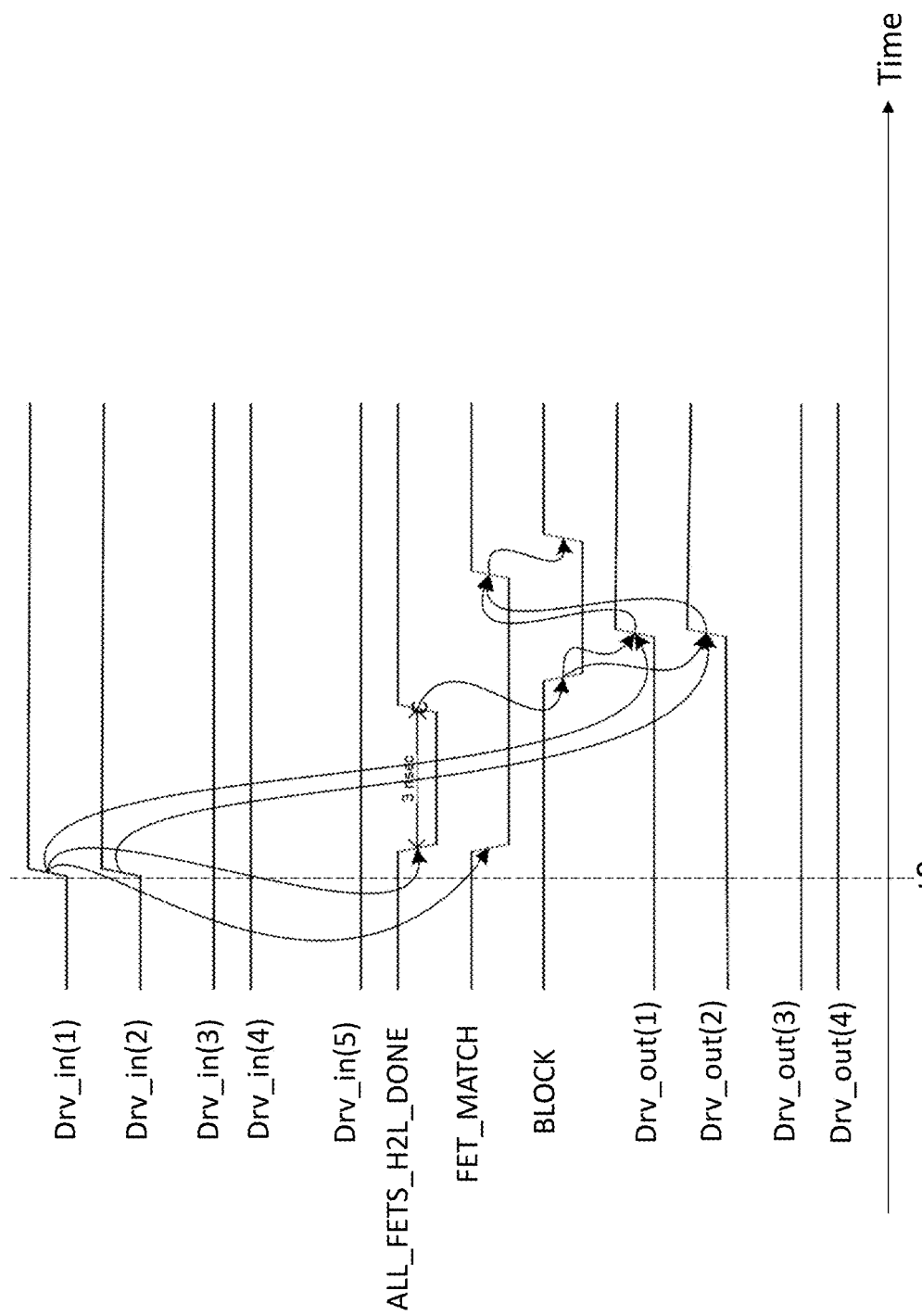
FIG. 9A is a waveform diagram illustrating the operation of the non-overlap controller of FIG. 4 when the driving sequence only involves turning on a plurality of power switches.

FIG. 9A illustrates operation when the non-overlap controller receives a driving sequence that only involves turning on a plurality of power switches. At an initial time t0 the input signals Drv_in(1) and Drv_in(2) go high. In turn the ALL_FETS_H2L_DONE signal and the FET_MATCH signal go both from high to low. The ALL_FETS_H2L_DONE signal remains low for a delay time set in this example at 3 ns. After this delay of 3 ns the BLOCK signal initially high goes low, hence allowing the output signals Drv_out(1) and Drv_out(2) to go high. Since the state of the drive out signals is the same as the drive in signals, the FET_MATCH signal goes high. Then the BLOCK signal returns to a high state.

Figure 9B:
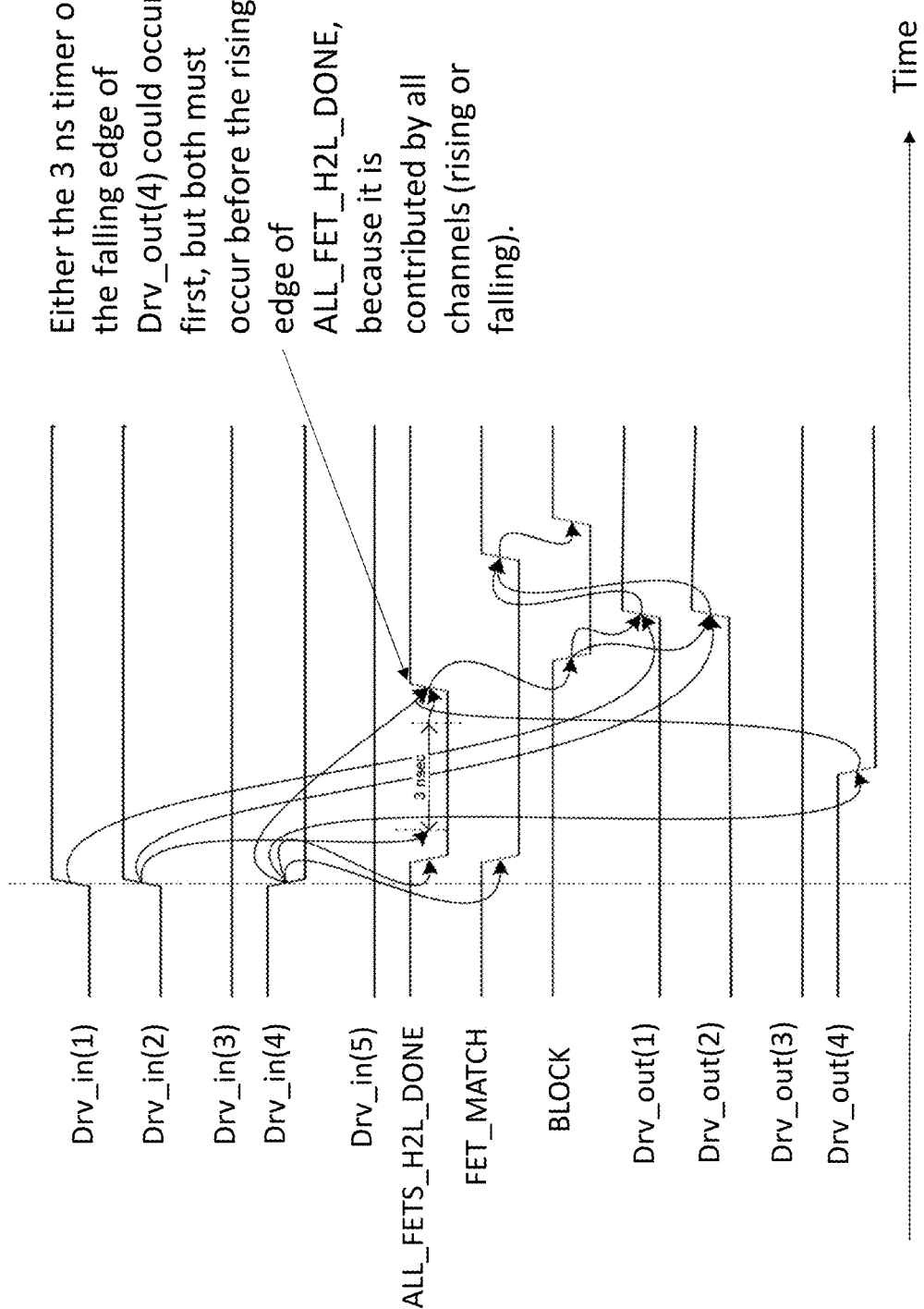
FIG. 9B is a waveform diagram illustrating the operation of the non-overlap controller of FIG. 4 when the driving sequence involves turning on some power switches and turning off others.

FIG. 9B illustrates operation when the non-overlap controller receives a driving sequence that involves turning on some power switches and turning off others.

At an initial time t0 the input signals Drv_in(1) and Drv_in(2) go high, while the Drv_in(4) goes low. In turn the ALL_FETS_H2L_DONE signal and the FET_MATCH signal go both from high to low. The output signal Drv_out(4) goes from high to low while the ALL_FETS_H2L_DONE remains low.

The ALL_FETS_H2L_DONE signal remains low for a delay time set in this example at 3 ns. After this delay of 3 ns the BLOCK signal initially high goes low, hence allowing the output signals Drv_out(1) and Drv_out(2) to go high. Since the state of the drive out signals is the same as the drive in signals, the FET_MATCH signal goes high. Then the BLOCK signal returns to a high state.

The 3 ns timer is started by the input signals being turned on, but if it takes longer than the 3 ns for one of them to turn off, then in that case, the ALL_FETS_H2L_DONE signal will wait until the last one of the Dry_out going off has actually turned off.

Figure 9C:
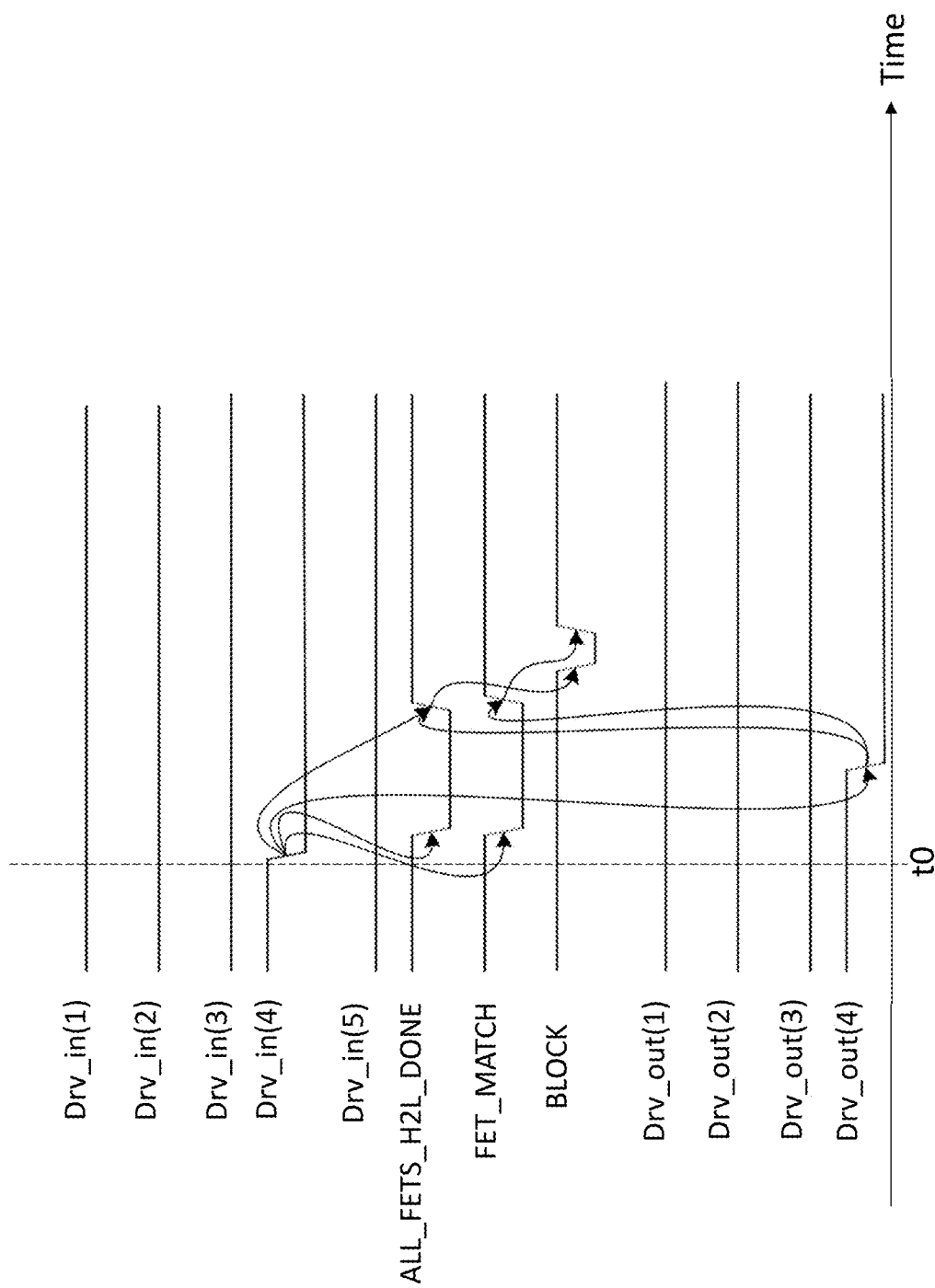
FIG. 9C is a waveform diagram illustrating the operation of the non-overlap controller of FIG. 4 when the driving sequence only involves turning off one or more power switches.

FIG. 9C illustrates operation when the non-overlap controller receives a driving sequence that only involves turning off one or more power switches.

At an initial time t0 the input signal the Drv_in(4) goes low. In turn the ALL_FETS_H2L_DONE signal and the FET_MATCH signal go both from high to low. The output signal Drv_out(4) goes from high to low while the ALL_FETS_H2L_DONE remains low. Since the state of the drive out signals is the same as the drive in signals, the FET_MATCH signal goes high.

After the delay time of the ALL_FETS_H2L_DONE signal, the BLOCK signal initially high goes low, remains low for a predetermined time window and goes back to high.

It will be appreciated that in this case the block signal is not needed and only optional. It can be used in case there is a channel being turned on. There is no timer involved in this action. The arrows in the figures shows the causal acknowledgement.

Figure 10A:
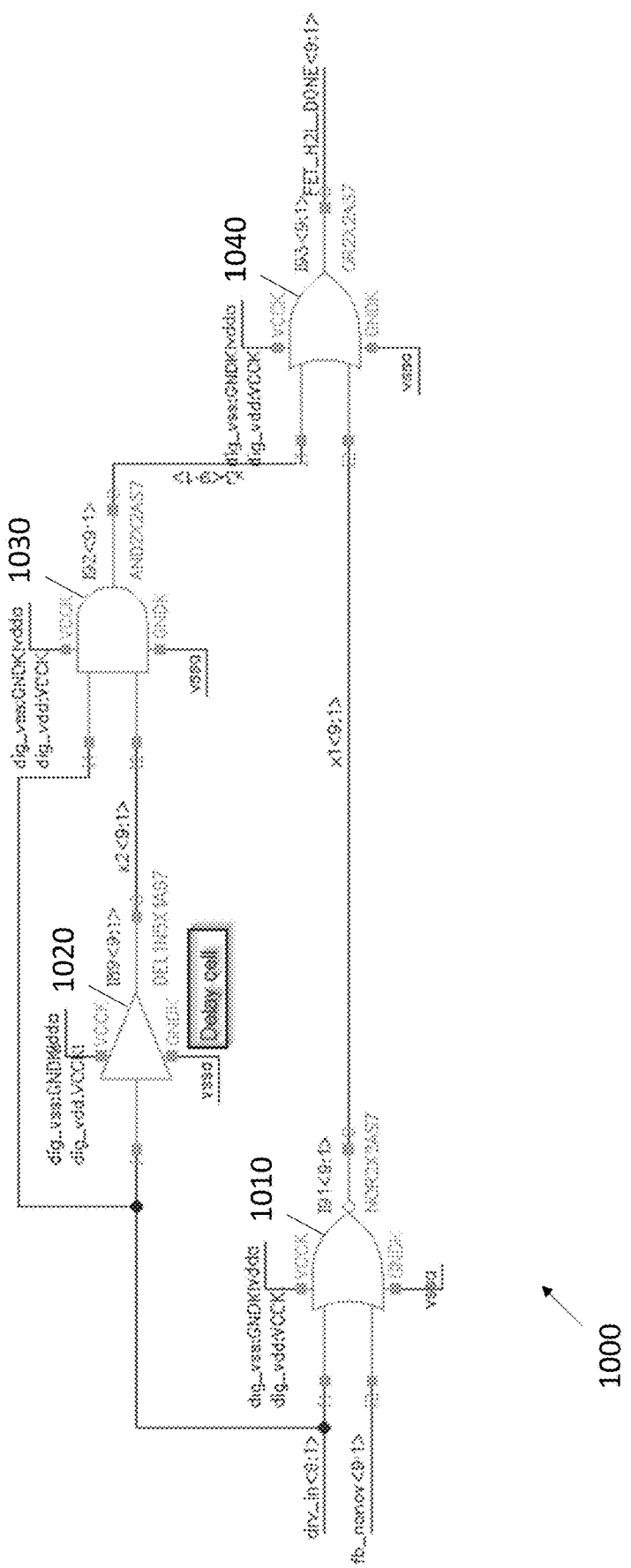
FIG. 10A is a diagram of a first part of a circuit for generating the ALL_FETS_H2L_DONE signal.
Figure 10B:
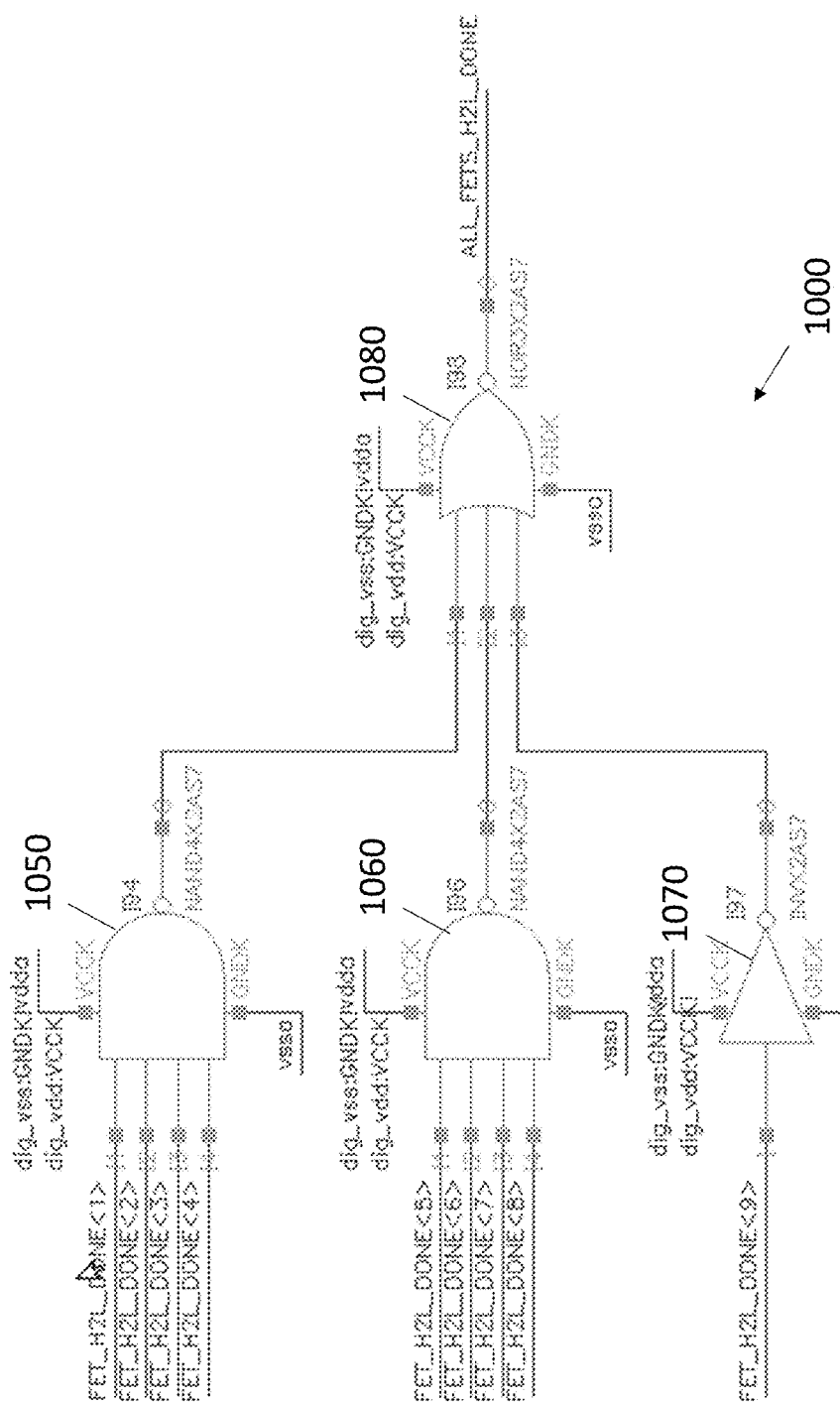
FIG. 10B is a diagram of a second part of a circuit for generating the ALL_FETS_H2L_DONE signal.

FIGS. 10A and 10B illustrate a diagram of a circuit for generating the ALL_FETS_H2L_DONE signal.

FIG. 10A is a diagram of the first part of the circuit 1000. For each power switch, the circuit 1000 includes an input NOR gate 1010, a delay cell 1020, an AND gate 1030, and an output OR gate 1040. For clarity only a single representation of each element is shown, however N instances of each elements 1010,1020,1030,1040 would be present leading N channels.

In operation, the input NOR gate 1010 receives the drive input signal dry_in and the feedback non-overlap signal fb_nonov. In this example a circuit with 9 power switches is considered, leading to 9 channels. The signals are shown as <9:1> to indicate the first signal of a total of 9 signals.

The input NOR gate 1010 outputs a logic high under two conditions. The first is when both inputs dry_in and fb_nonov are low. The second condition is when the dry_in is high for at least 3 nsec regardless of the state of fb_nonov.

As a result, if the corresponding power switch is turned off by dry_in having gone low, the FET_H2L_DONE out will go low until the fb_nonov for this channel goes low. If the dry_in signal is previously high and is not changing, then FET_H2L_DONE will remain high. But if the dry_in signal is low and goes high then the FET_H2L_DONE signal will go away for 3 ns.

The delay is implemented by the delay cell 1020. The main purpose of the delay is to ensure that when the power switches are turning on, that even if a zero delay is selected that it will block for a minimum of 3 ns so if there is a skew on the input drive signals, they will all be captured before one of them goes away. This feature is not needed when the power switches are only turning off since there is no blocking needed to turn off a power switch. It is also not needed if a non-zero delay is selected for the programmable synthesized delay. The delay is intended to protect the system from any skew between channels as it should be designed to be larger than the max skew over process voltage temperature (PVT).

FIG. 10B is a diagram of the second part of the circuit 1000. This second part of the circuit includes two four input NAND gates 1050 and 1060, a single input (1 bit) NAND gate 1070 and a NOR gate 1080.

All N of the FET_H2L_DONE signals are sent to the second part of the circuit 1000 to allow the system to know when all signals that are supposed to be low are in fact low according to the fb_nonov signal. The AND function implemented by the gates 1050, 1060, 1070, and 1080 is used to ensure that ALL channels that need to be zeroed have been zeroed.

In this example four FET_H2L_DONE signals are received by the AND gate 1050, another four FET_H2L_DONE signals are received by the AND gate 1060, and the last FET_H2L_DONE signal is received by the delay 1070. The outputs of 1050, 1060 and 1070 are sent to the NOR gate 1080 to generate the ALL_FET_H2L_DONE signal.

Figure 11:
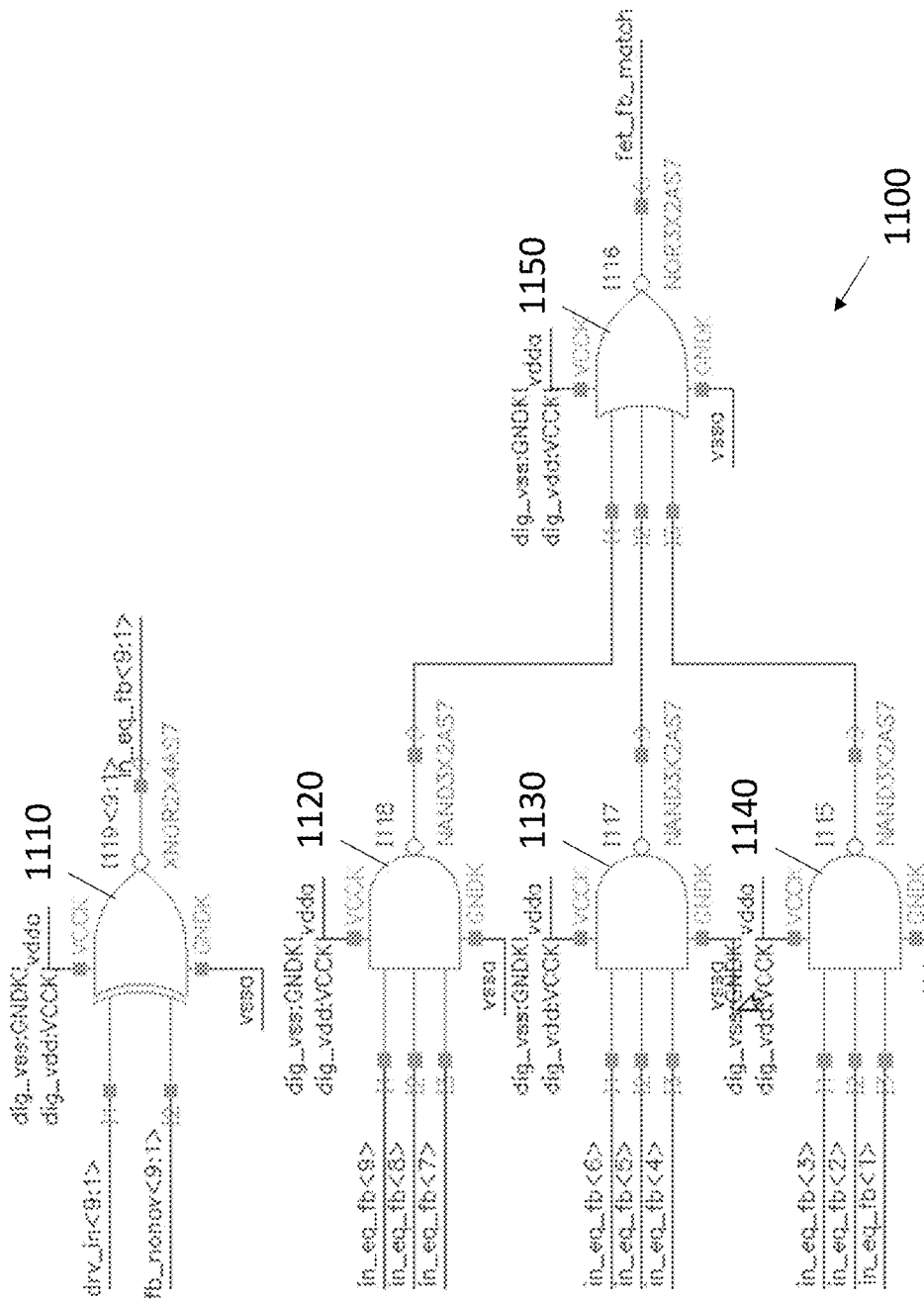
FIG. 11 is a diagram of a circuit for generating a power switch feedback match signal.

FIG. 11 is a diagram of a circuit for generating a power switch feedback match (fet_fb_match) signal. The circuit 1100 includes 9 XNOR gates 1110 (only one being represented for clarity), three NAND gates 1120, 1130, 1140, and a NOR gate 1150. The XNOR gates 1110 receive the input drive and feedback non-overlap signals to generate a 9 bit output signal labelled in_eq_fb signal. In this example 9 in_eq_fb signals are generated, three of them are send to the NAND gate 1120, three to the NAND gate 1130 and another three to NAND gate 1140. The outputs of the NAND gates are then fed to the NOR gates 1150 to generate the fet_fb_match signal.

The fet_fb_match signal is used to know when the non-overlap feedback outputs (fb_nonov<9:1>) are matched to the input drive signals (drv_in<9:1>). This will not contain a leading edge glitch so long as the feedback delay is guaranteed to be longer than the skew on the input drv_in<9:1>signals.

Referring back to FIG. 9A, it can be observed that when the signal Drv_in(1) and Drv_in(2) rise from low to high, this causes the fall of ALL_FETS_H2L_DONE and FET_MATCH signals. The ALL_FETS_H2L_DONE signal falls because the lower leg of the circuit in FIG. 10A goes low and the upper leg will not go high until propagating through the delay cell 1020.

Since there are no switches turned off, this output will remain low for the duration of that delay cell 1020. The FET_MATCH signal goes low due to the fact that the dry_out is no longer equal to the dry_in signal for all switches since Drv_out(1) and Drv_out(2) have not responded since the BLOCK signal is still true. Through causal asynchronous logic, after the ALL_FETS_H2L_DONE returns high the BLOCK signal is lowered. This permits the Drv_out(1) and Drv_out(2) signals to pass through their corresponding MUTEX cells.

This then causes the FET_MATCH signal to become true since Drv_in(1) through Drv_in(5) are now equal to Drv_out(1) through Drv_out(5). Again through asynchronous causal logic, after FET_MATCH is again true, the BLOCK signal will again go high hence blocking the transition of any output from a low to a high state.

It will be appreciated that the driving logic may be configured to prevent a switch setting that would violate shoot-through. The circuits presented in this disclosure only ensures that it does not happen as a result of the transitions between states.

Referring back to FIG. 9B, it can be observed that once the signal Drv_in(4) has gone low, this causes the ALL_FETS_H2L_DONE signal to drop to a low state indicating that there are signals that have been driven low and have not responded to that state yet. This also causes the FET_MATCH signal to go low (deasserted). The MUTEX logic in each channel can only block a transition going from a low to high state. It will not block a transition going from a high state to a low state. Therefore, the Drv_out(4) signal will directly respond to the Drv_in(4) signal and become deasserted. This will cause the FET_H2L_DONE signal to assert high for that channel, but the ALL_FETS_H2L_DONE signal will not assert high until the 3 ns timer has expired for the switches that are transitioning to the on state. Then, due to asynchronous causal logic, the BLOCK signal will be deasserted which will allow the response of Drv_out(1) and Drv_out(2) to assert high in agreement with the Drv_in(1) and Drv_in(2) signals. This will cause the FET_MATCH to occur which will then cause the BLOCK signal to be asserted hence blocking any further rising transitions until the next change from the input drive signals Drv_in(1) to Drv_in(5) is seen.

When the input drive signals are skewed, a pulse may appear in the center of the ALL_FETS_H2L_DONE signal if the skew is larger than the round trip delay through the selected feedback or delay. However, since the ALL_FETS_H2L_DONE signal is only observed through a so-called Wait cell, it will not cause a failure in the operation of the circuit. This is true even in the case where that pulse which occurs in the center of the low going ALL_FETS_H2L_DONE signal becomes arbitrarily short. The fet_fb_match signal goes to the mutex circuit of FIG. 12C and from there to the STG circuit of FIGS. 13 and 14A. The mutex cleans up the fet_fb_match and the fet_match_out of FIG. 14A is clean and acceptable for use back at the FSM 410.

Referring back to FIG. 9C, it can be observed that in this case once the Drv_in(4) has gone low, the ALL_FETS_H2L_DONE will go low and so will the FET_MATCH. They will both go high again as soon as the feedback indicates that the high to low transitions have been completed. This could result in the ALL_FETS_H2L_DONE going low for a very short duration but it does not matter since no switch is being turned on and therefore no blocking is necessary.

The two input singals ALL_FETS_H2L_DONE and fet_fb_match will need to be observed by a simple state machine to implement the timing in the above descriptions. For instance this may be implemented with a Quasi-Delay-Insensitive (QDI) asynchronous state machine. As seen in the timing descriptions above, one needs to observe the falling edge of the ALL_FETS_H2L_DONE signal, the rising edge of the same signal, and the rising edge of the fet_fb_match signal.

Therefore, these three instances in time will be asynchronously observed using wait cells, also referred to as sanitization cells. A wait cell may be implemented by a mutex with an inversion on the R1 input.

Figure 12A:
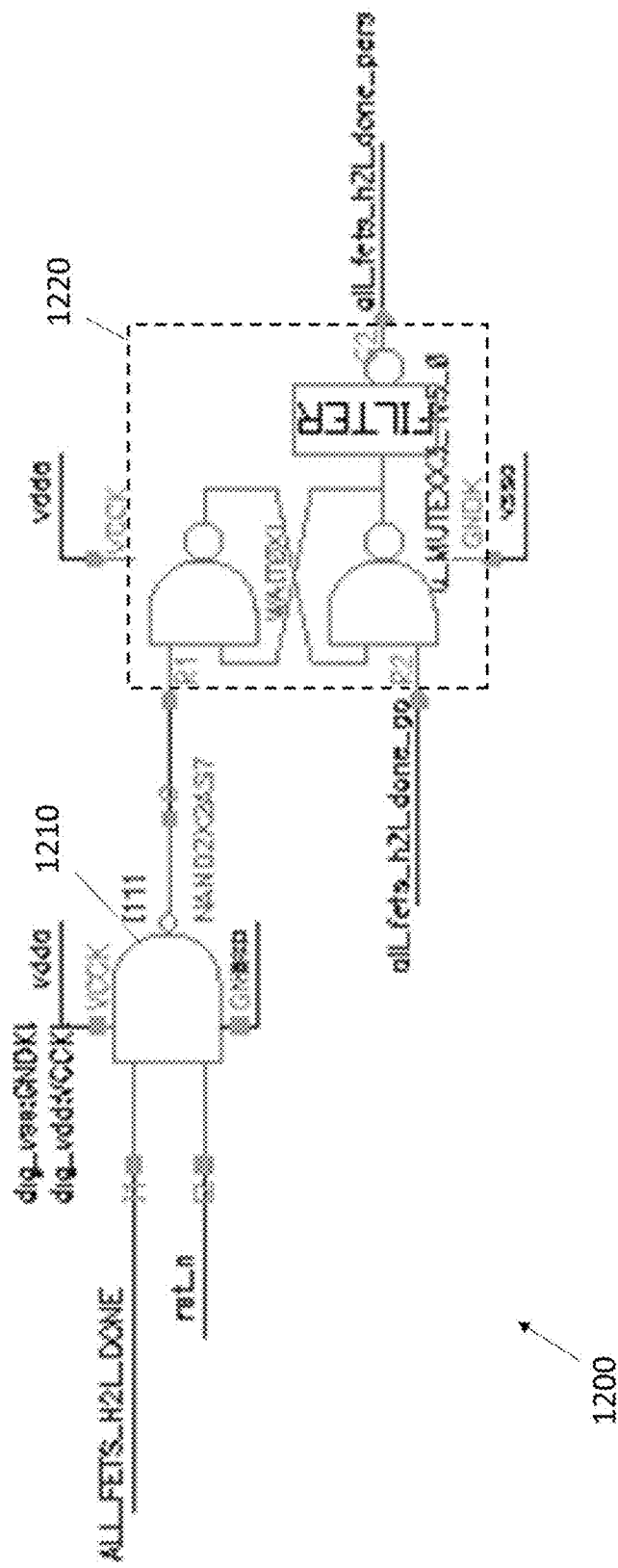
FIG. 12A is a diagram of a wait cell for observing the rising edge of the ALL_FETS_H2L_DONE signal.

FIG. 12A is a diagram of a wait cell for observing the rising edge of the ALL_FETS_H2L_DONE signal.

The wait cell 1200 includes a NAND gate 1210 coupled to a MUTEX element 1220. The NAND gate 1210 receives the ALL_FETS_H2L_DONE signal and the reset signal rst_n. The MUTEX cell 1220 receives the output of the NAND gate at input R1, an all_fets_h2l_done_go signal at input R2, and provides a persistent signal labelled all_fets_h2l_done_pers signal at output G2.

The all_fets_h2l_done_go signal comes from an asynchronous controller (not shown) that tells the MUTEX cell that it is waiting for non-persistent ALL_FETS_H2L_DONE signal. That signal is low at the time asynchronous logic starts to wait for it, and therefore R1 is true and has taken priority on the MUTEX element. When the all_fets_h2l_done_go signal is asserted by the asynchronous controller the all_fets_h2l_done_pers signal will not go true until the ALL_FETS_H2L_DONE input goes high. When it goes high, the R1 input to the mutex is deasserted which allows the R2 to be granted on G2. This output, called all_fets_h2l_done_pers is called a persistent signal because it will not deassert, even if the input ALL_FETS_H2L_DONE deasserts, until the all_fets_h2l_done_go signal desserts. This implements causal acknowledgement through the controller, and it ensures that the asynchronous controller will only see inputs that are expected by it when they are expected by it.

Figure 12B:
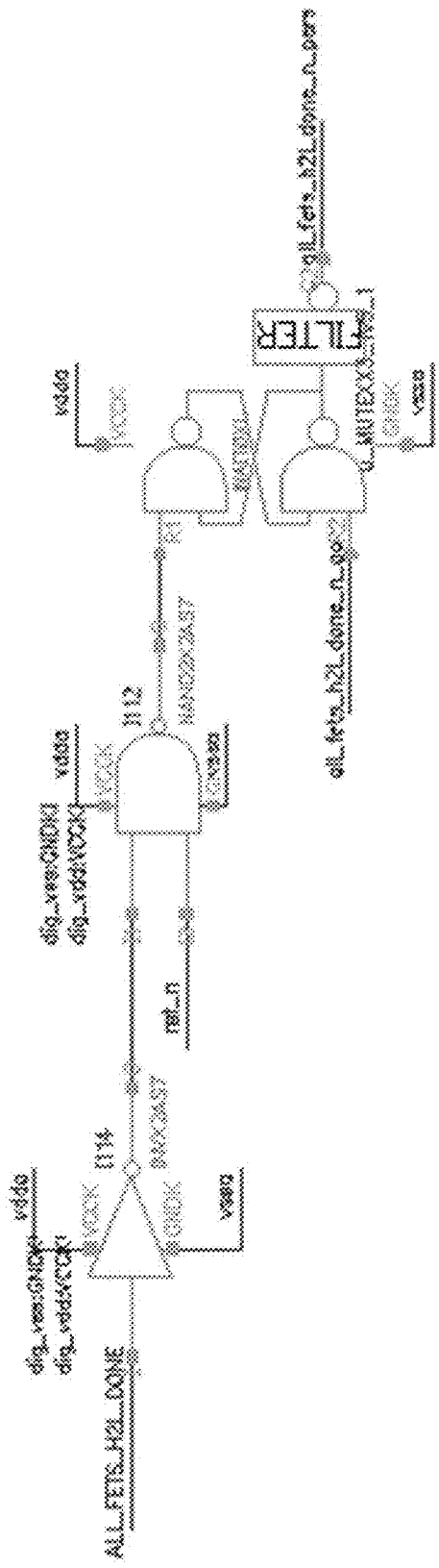
FIG. 12B is a diagram of a wait cell for observing the falling edge of the ALL_FETS_H2L_DONE signal.

FIG. 12B is a diagram of a wait cell for observing the falling edge of the ALL_FETS_H2L_DONE signal. The difference between the circuit of FIGS. 12A and 12B is that with the circuit of FIG. 12A the asynchronous circuit is looking for the ALL_FETS_H2L_DONE input to be high, while in the circuit of FIG. 12B the all_fets_h2l_done_n_go input is looking for the same ALL_FETS_H2L_DONE input to be low. The circuit of FIG. 12A includes an extra inverter on the R1 input.

Figure 12C:
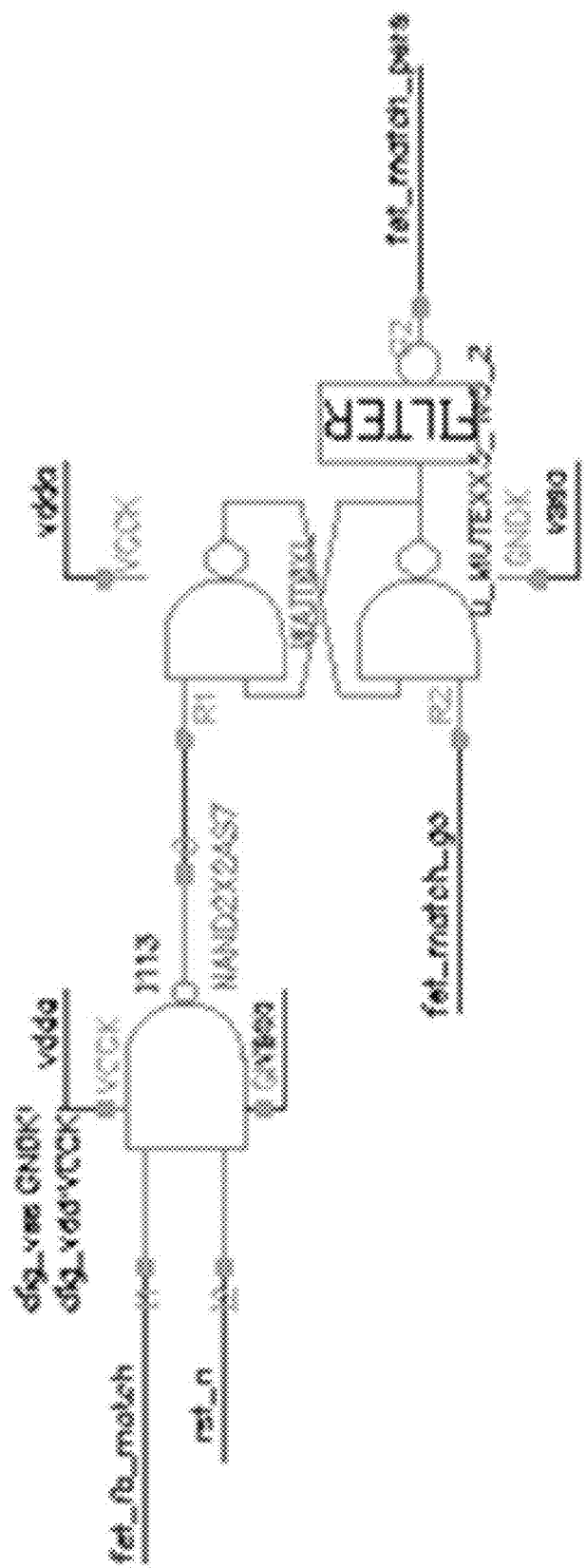
FIG. 12C is a diagram of a wait cell for observing the rising edge of the fet_fb_match signal.

FIG. 12C is a diagram of a wait cell for observing the rising edge of the fet_fb_match signal.

Figure 13:
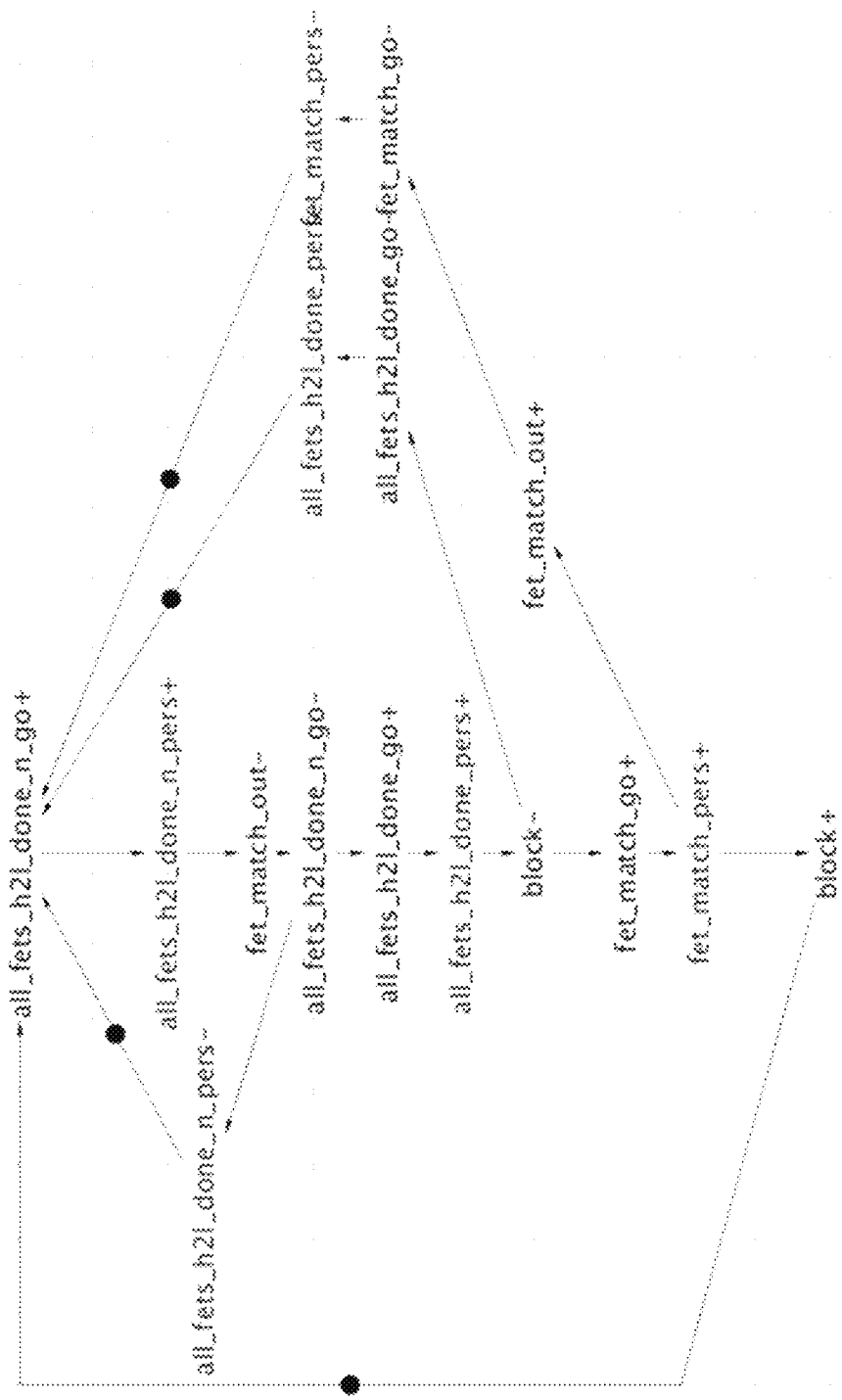
FIG. 13 is a signal transition graph describing the behaviour of an asynchronous circuit.
Figure 14A:
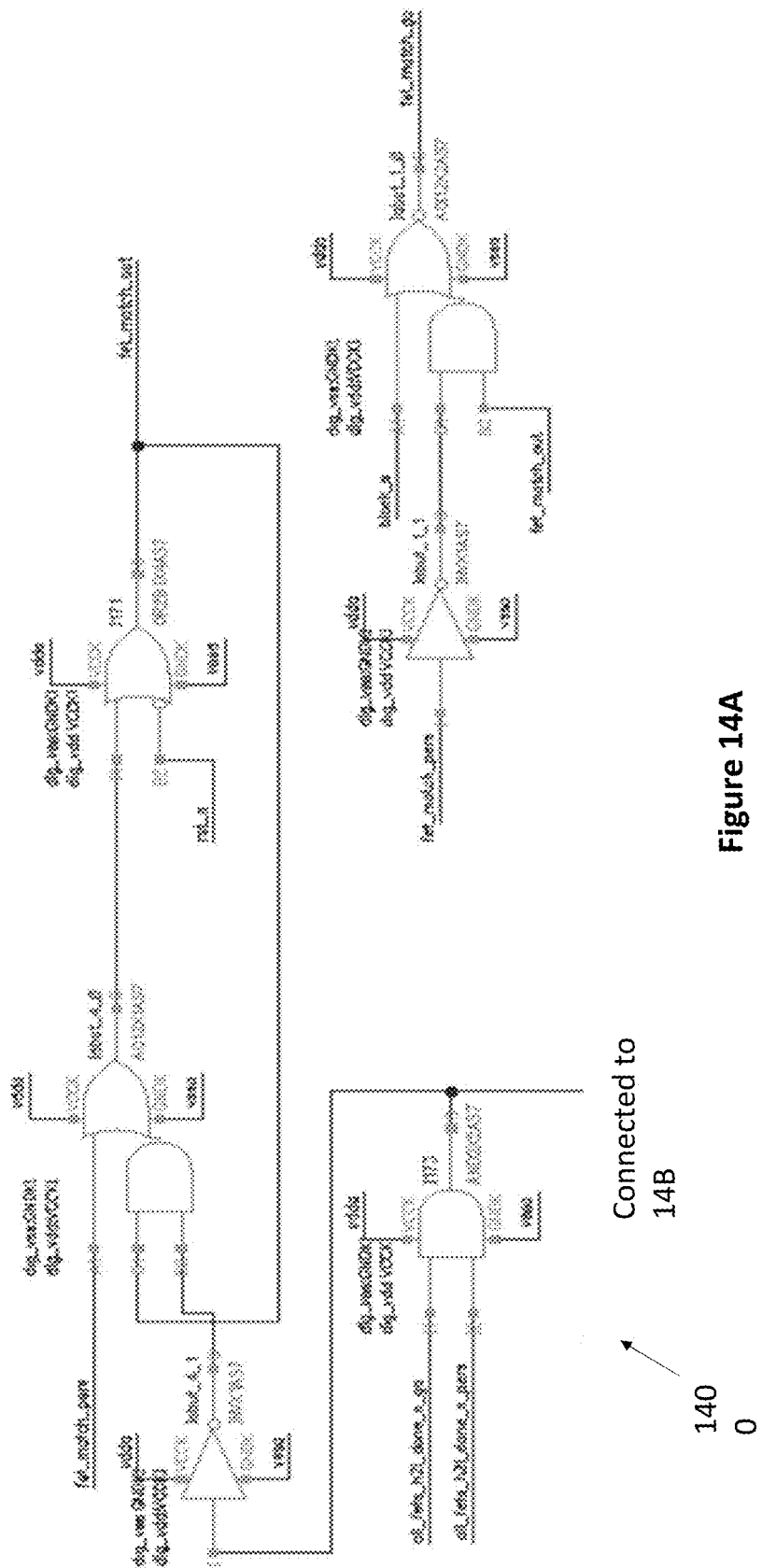
FIG. 14 (A&B) is a diagram of an asynchronous state machine for implementing the signal transition graph of FIG. 13.

FIG. 13 is a signal transition graph (STG) describing the behaviour of an asynchronous circuit. The two input signals ALL_FETS_H2L_DONE and fet_fb_match can be observed by a state machine. For instance this may be implemented with a Quasi-Delay-Insensitive (QDI) asynchronous state machine.

The signal transition graph STG describes the causal relationship between signalling events for such as an asynchronous QDI circuit, and how the circuit will behave. The STG can also be described as a contract between itself and its environment. According to this contract, if the inputs behave according to the diagram, then the outputs will also behave according to the diagram. The Wait Cells described above in FIGS. 12A, 12B and 12C provide so called persistent signals that will only transition when they are expected to, regardless of the timing of the raw inputs ALL_FETS_H2L_DONE and fet_fb_match.

The fet_match_out signal is generated as one of the STG outputs. The fet_fb_match signal is observed by the STG of FIG. 13 (implemented by FIG. 14). It is also observed through the wait cell of FIG. 12C. The fet_match_go and the fet_match_pers signals are associated with the raw signal fet_fb_match (See FIG. 12C).

The signals ending in "_pers" represent inputs signals to the asynchronous state machine. These input signals come from the MUTEX based Wait cells of FIG. 12. The other remining signals are outputs from the asynchronous state machine that will be synthesized from the STG. The + and − signs indicate whether the signal will transition from a low to a high or a high to a low, respectively. The dots indicate the initial conditions of the state of the asynchronous state machine.

The sequence of operations of the QM asynchronous state machine is as follows. After power on reset, the ALL_FETS_H2L_DONE raw input is true as nothing has been turned on yet. This STG will assert the "all_fets_h2l_done_n_go" signal and wait for the "all_fets_h2l_done_n_pers" signal to go high indicating that the ALL_FETS_H2L_DONE signal has gone low. Then the "all_fets_h2l_done_go" is asserted by the STG circuit which will wait for the ALL_FETS_H2L_DONE signal to go high again which will happen either due to the delay cell or the occurrence of the signals that are newly driven low having outputs that have fallen low. Then the "block" signal is driven low which will allow any switch drive out signals to pass through their blocking MUTEX elements. After lowering the "block" signal, the "fet_match_go" signal is asserted which will enable the wait cell for observing the "fet_fb_match" signal. When it goes high, the "fet_match_pers" signal will assert. This will cause "block" to be deasserted. The three go signals are released after the STG has captured each of their events which will cause the persistent signal to go low as well. This STG also outputs a signal called fet_match_out. This signal is the actual source of the FET_MATCH signal that goes back the embedded driver state machine indicating to it that the FET's have been updated. This will guarantee a clean cycle of fet_match going away and returning once per cycle.

Figure 14B:
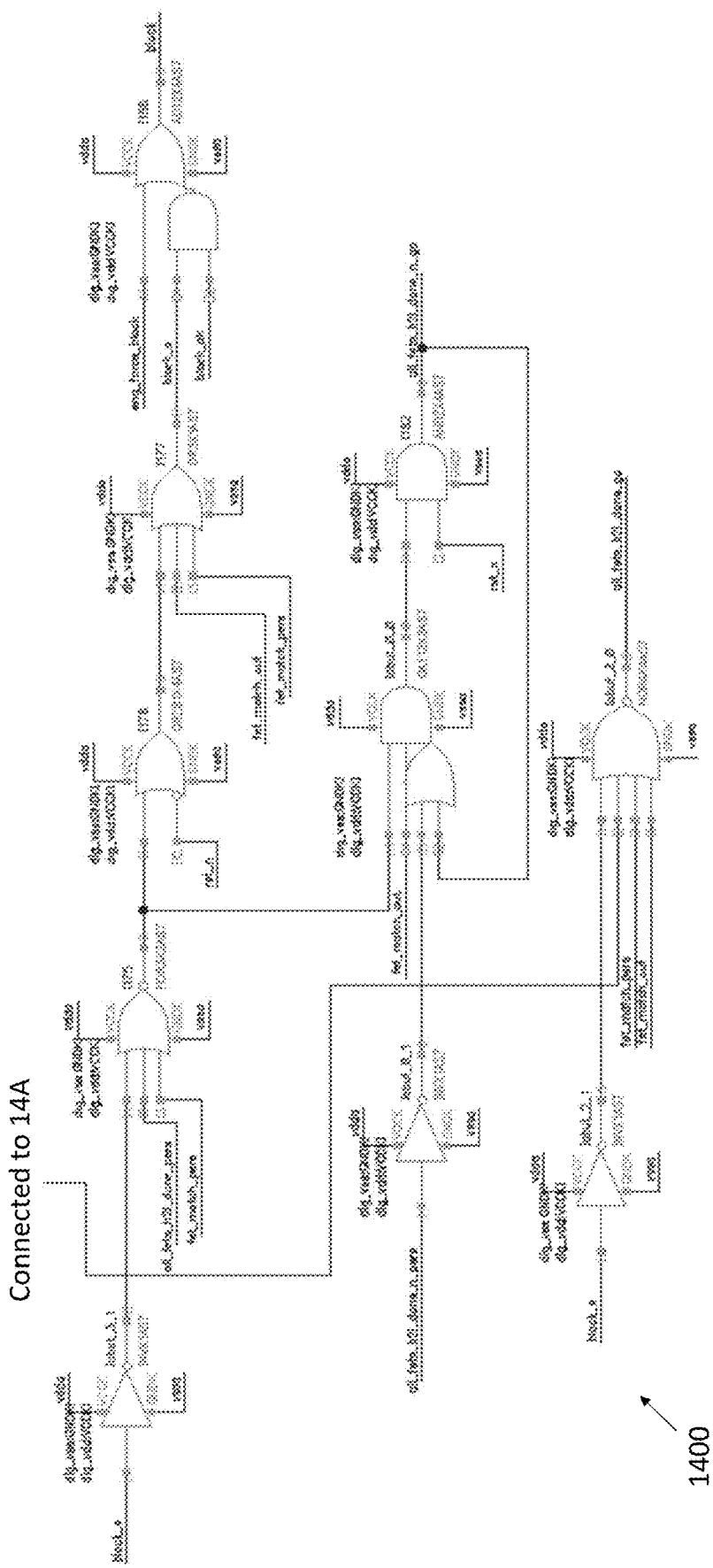

FIG. 14 is a diagram of a QDI asynchronous state machine for implementing the signal transition graph of FIG. 13. The QDI circuit 1400 is shown in two part 14A and 14B and was synthesized using the Workcraft tool.

The asynchronous quasi-delay-insensitive control circuit is used to control the block signal that prevents any power switch to be turned on until it is determined that all power switches that should be turned off in the next state are successfully turned off first.

The above circuit is included at the top level of the non-overlap module. A power on reset is provided to assure proper circuit initialization on power up through the rst_n signal. The block signal output from this STG synthesized QDI circuit will drive the block signal input for all of the N cells 430.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A driver for driving a switched mode power supply having a plurality of power switches, the driver being adapted to receive a set of one or more input signals, each input signal being configured for changing a state of an associated power switch from a first state to a second state,
wherein for each input signal in the set, the driver is configured to generate an output signal to change the state of the associated power switch from the first state to the second state,
wherein when the first state is an on state in which the power switch is turned on and the second state is an off state in which the power switch is turned off, the driver asserts the output signal to change the state of the associated power switch to perform an on-off transition; and when the first state is the off state and the second state is the on state, the driver delays the assertion of the output signal to perform an off-on transition by a predetermined delay time, so that the off-on transition is delayed until all intended on-off transitions have occurred, and
wherein the driver comprises a logic circuit adapted to generate a first logic signal having a first state to prevent an assertion of the output signal for changing the associated power switch from the off state to the on state, and a second state to permit the assertion of the output signal for changing the associated power switch from the off state to the on state.

2. The driver as claimed in claim 1, wherein the driver comprises a plurality of control cells, each control cell comprising a first circuit configured to receive an input signal from the set of input signals and to generate the said output signal.

3. The driver as claimed in claim 1, wherein:
the logic circuit is adapted to generate a second logic signal, having a first state and a second state; and
the logic circuit being configured to set the second logic signal into the first state when the states of the said one or more input signals match the states of the one or more output signals, and to set the second logic signal into the second state when the states of the said one or more input signals do not match the states of the one or more output signals.

4. The driver as claimed in claim 3, wherein:
the logic circuit is adapted to generate a third logic signal, having a first state and a second state; and
the logic circuit being configured to set the third logic signal into the second state upon receipt of the set of one or more input signals, to maintain the third logic signal in the second state for the predetermined delay time, and to set the third logic signal back into the first state once all the power switches intended to be turned off have been turned off.

5. The driver as claimed in claim 2, wherein the first circuit comprises a memory device coupled to an arbitration circuit, the arbitration circuit having a first input for receiving the first logic signal, a second input for receiving the output of the memory device and an output for providing the output signal.

6. The driver as claimed in claim 5, wherein the memory device comprises a flip-flop and wherein the arbitration circuit comprises a mutual exclusion cell.

7. The driver as claimed in claim 2, wherein each control cell comprises a second circuit configured to generate a feedback signal indicating when a power switch can be turned on without overlap with another power switch being turned on.

8. The driver as claimed in claim 7, wherein each control cell comprises a third circuit configured to generate a programmable delay signal.

9. The driver as claimed in claim 8, wherein the first circuit and the second circuit are adapted to receive the programmable delay signal.

10. The driver as claimed in claim 2, wherein the logic circuit comprises an asynchronous state machine configured to generate the first logic signal and a second logic signal.

11. The driver as claimed in claim 10, comprising a circuit portion configured to generate a second feedback signal associated with the second logic signal.

12. The driver as claimed in claim 11, wherein the logic circuit comprises a plurality of wait cells.

13. The driver as claimed in claim 12, wherein:
a first wait cell is configured to identify the rising edge of a third logic signal;
a second wait cell is configured to identify the falling edge of the third logic signal; and
a third wait cell is configured to identify the rising edge of the second feedback signal.

14. The driver as claimed in claim 7, wherein:
the logic circuit comprises a sub circuit configured to generate the third logic signal, wherein the sub circuit comprises:
a first portion adapted to receive the input signal and the feedback signal and to generate an intermediate signal for each power switch; and
a second portion adapted to receive the intermediate signal from each power switch and to generate the third logic signal.

15. The driver as claimed in claim 14, wherein the first portion comprises a delay cell for each power switch.

16. A method of driving a switched mode power supply having a plurality of power switches, the method comprising:
receiving a set of one or more input signals, each input signal being configured for changing a state of an associated power switch from a first state to a second state;
for each input signal in the set, generating an output signal to change the state of the associated power switch from the first state to the second state,
wherein when the first state is an on state in which the power switch is turned on and the second state is an off state in which the power switch is turned off, asserting the output signal to change the state of the associated power switch to perform an on-off transition;
when the first state is the off state and the second state is the on state, delaying the assertion of the output signal to perform an off-on transition by a predetermined delay time, so that the off-on transition is delayed until all intended on-off transitions have occurred; and
generating a first logic signal having a first state to prevent an assertion of the output signal for changing the associated power switch from the off state to the on state, and a second state to permit the assertion of the output signal for changing the associated power switch from the off state to the on state.

17. The method according to claim 16, comprising:
generating a second logic signal, having a first state and a second state;
setting the second logic signal into the first state when the states of the said one or more input signals match the states of the one or more output signals; and
setting the second logic signal into the second state when the states of the said one or more input signals do not match the states of the one or more output signals.

18. The method according to claim 17, comprising:
generating a third logic signal, having a first state and a second state;
setting the third logic signal into the second state upon receipt of the set of one or more input signals, to maintain the third logic signal in the second state for the predetermined delay time; and
setting the third logic signal back into the first state once all the power switches intended to be turned off have been turned off.

\* \* \* \* \*